No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 1.
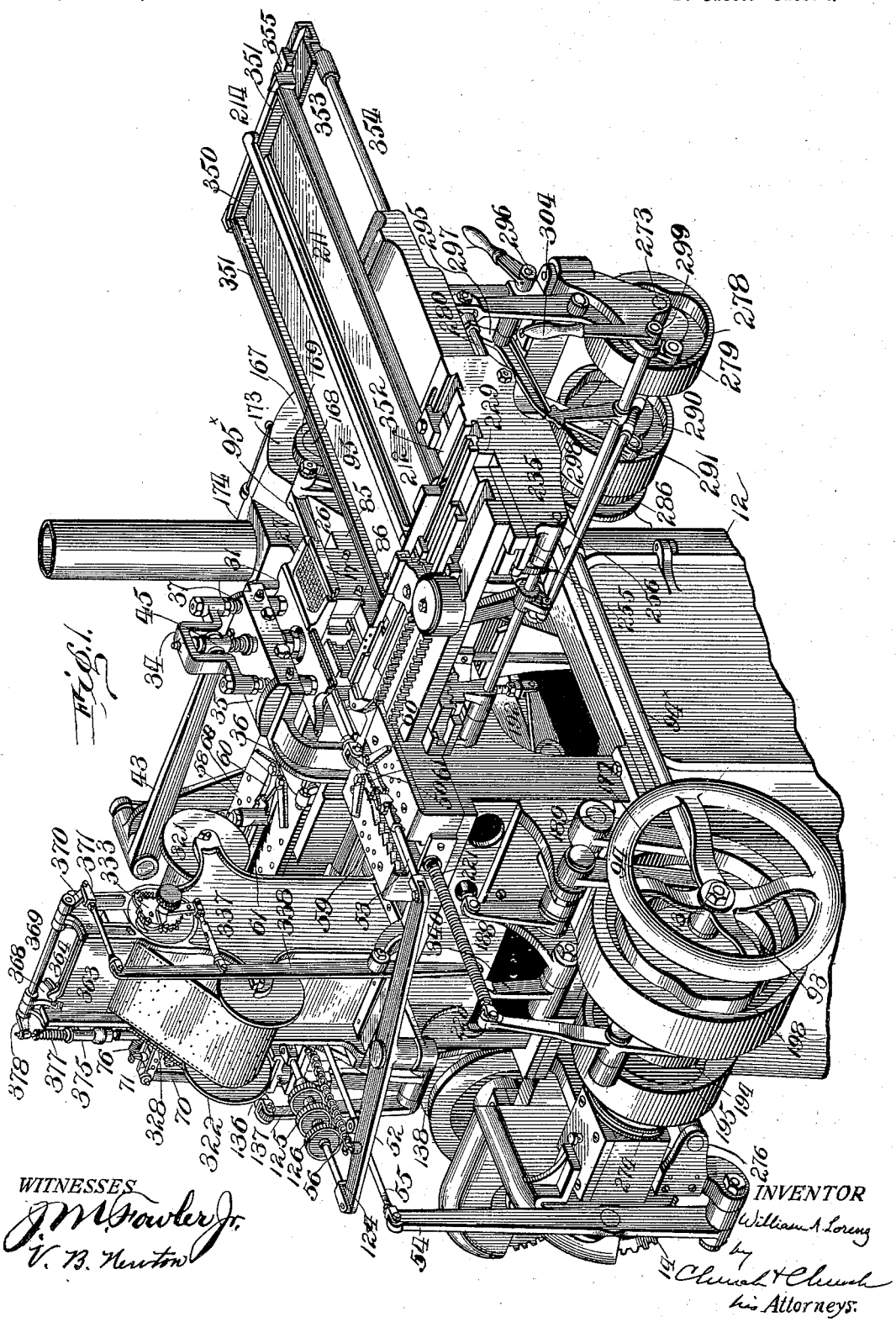
WITNESSES
INVENTOR
William A. Lorenz
by
Church & Church
his Attorneys.

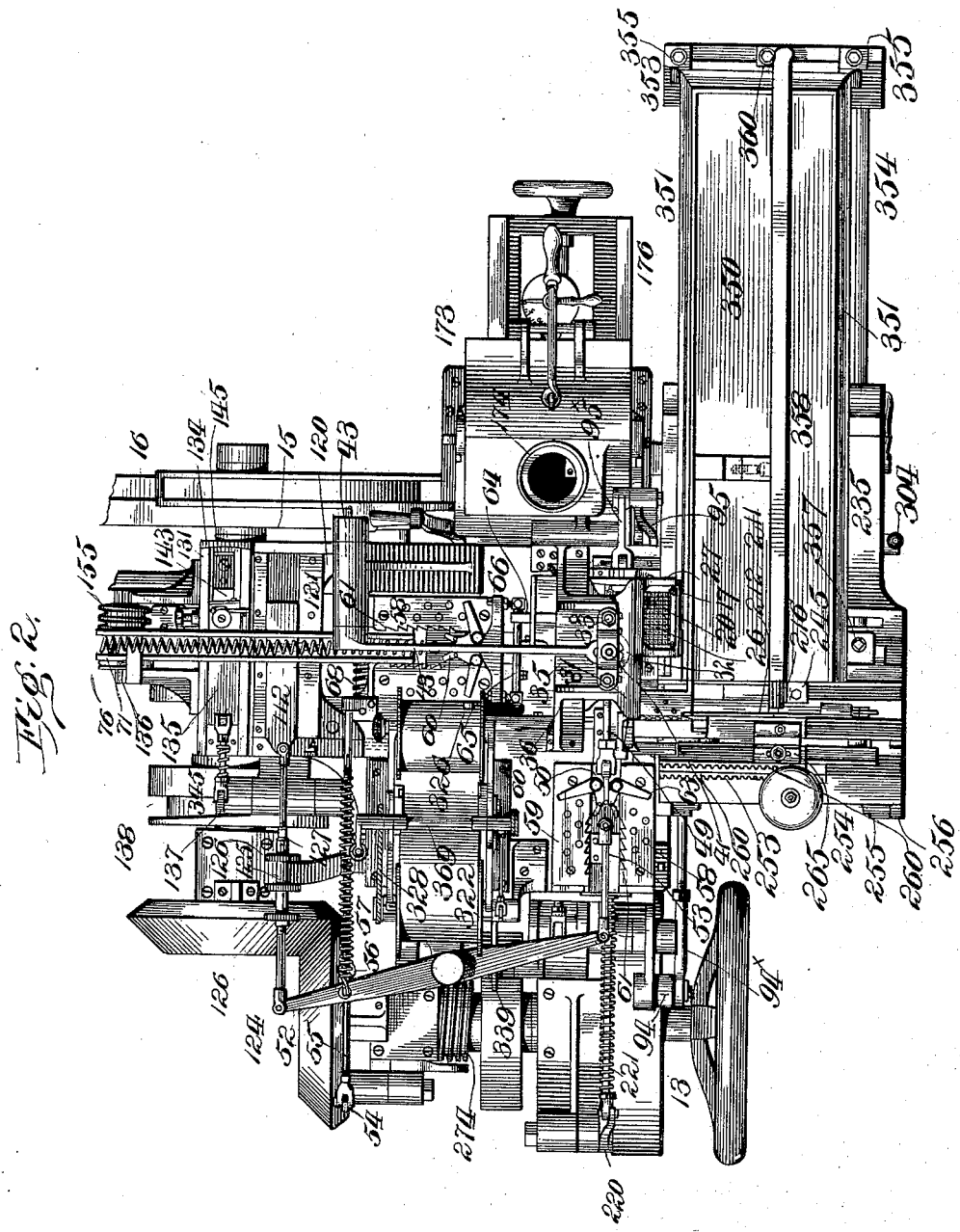

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 3.
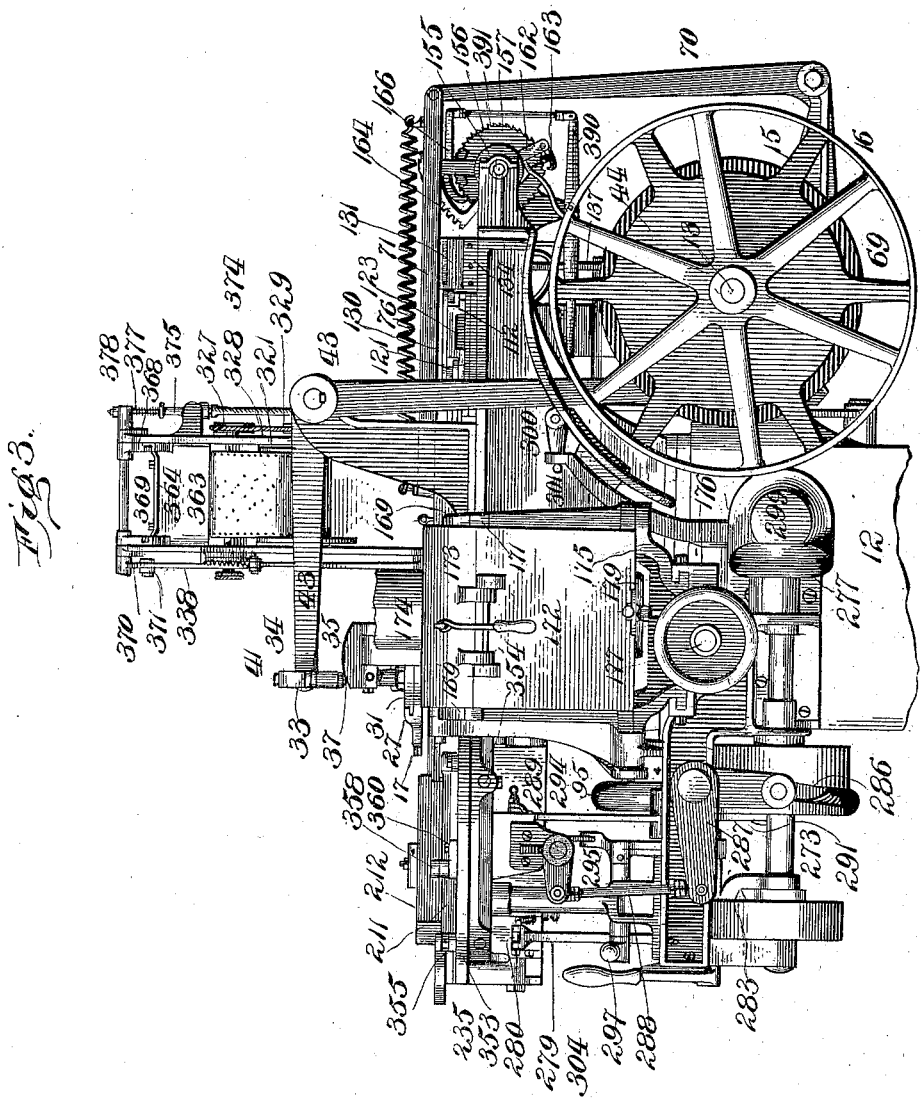
WITNESSES
INVENTOR
William A. Lorenz
by Church & Church
his Attorneys No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 4.
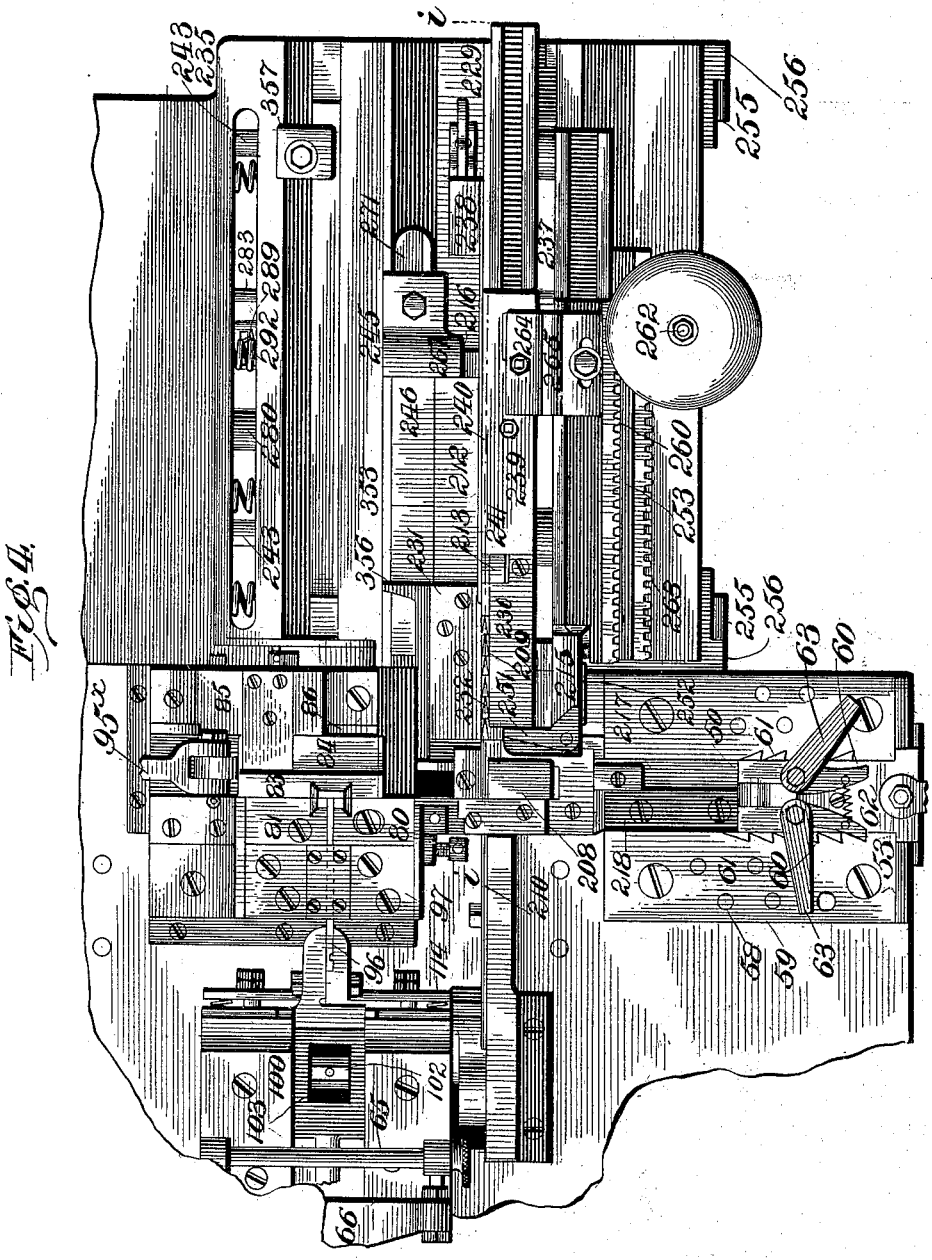
WITNESSES
INVENTOR No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 5.
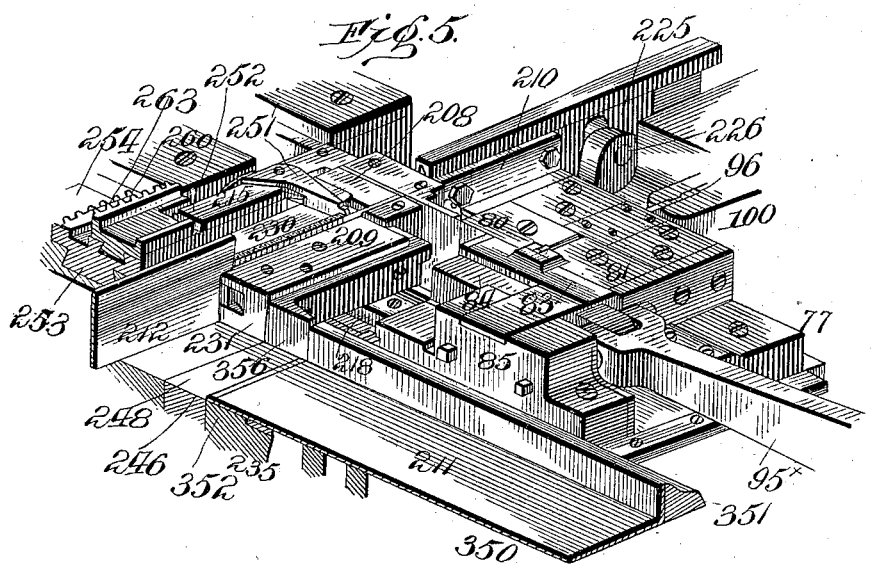
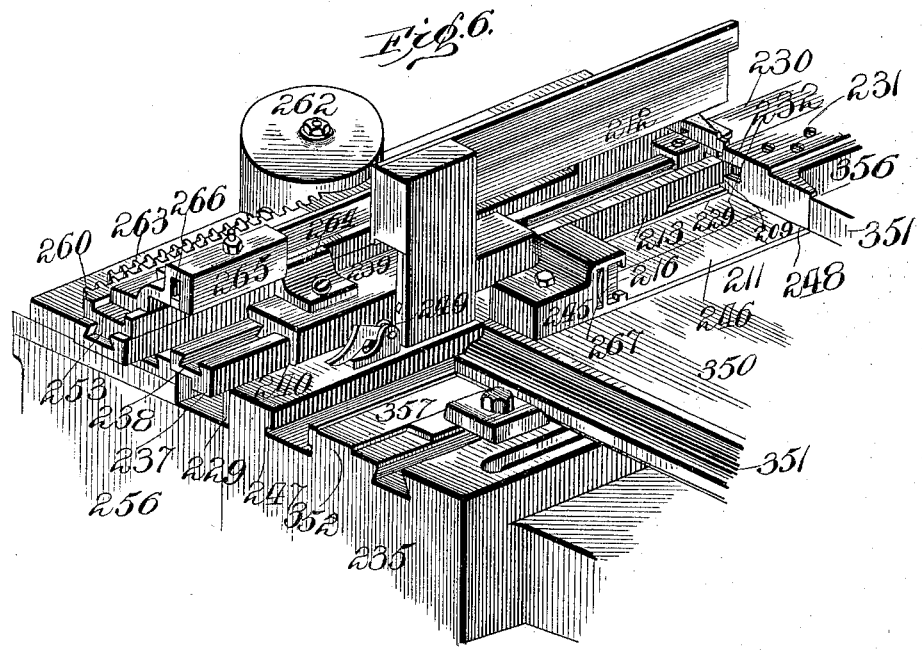
WITNESSES
INVENTOR
William A. Lorenz
by Church & Church
his Attorneys.

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 6.

Fig. 7.

WITNESSES
INVENTOR
William A. Lorenz
his Attorneys

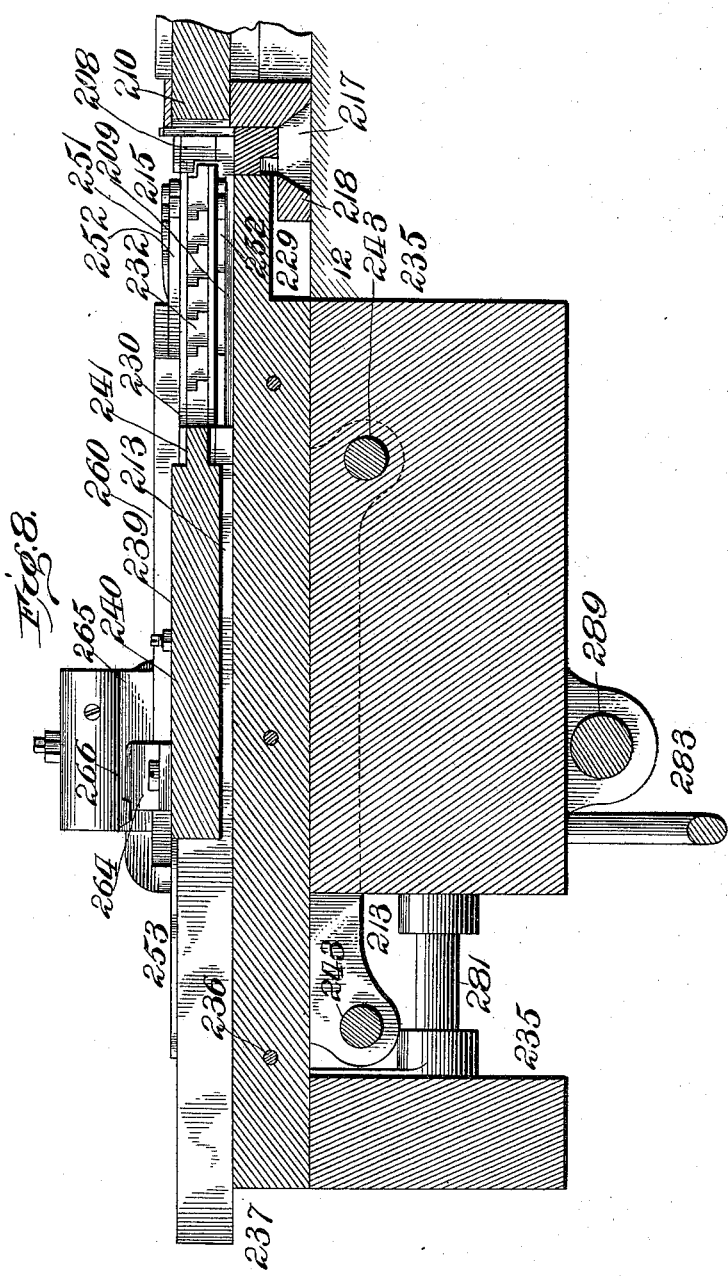

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 8.
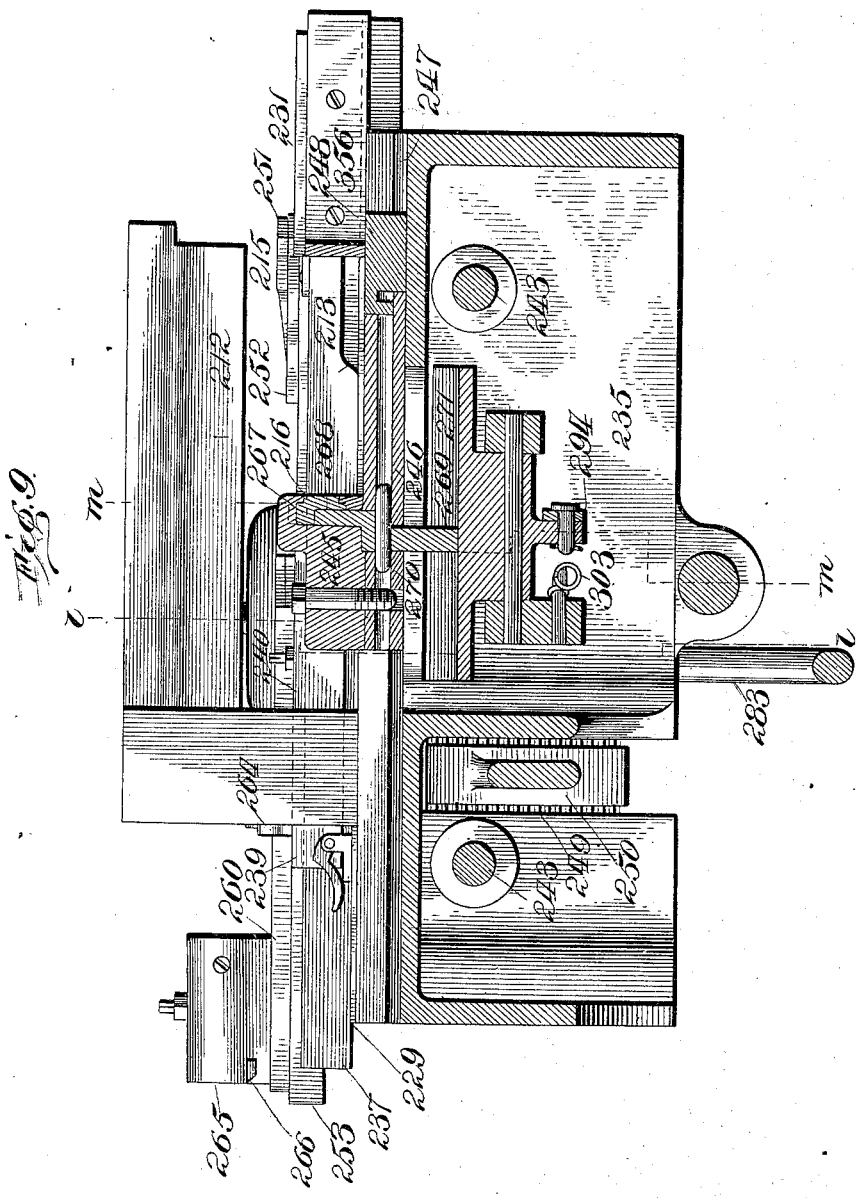
WITNESSES
INVENTOR
William A Lorenz,
by Church & Church
Attorneys No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 9.
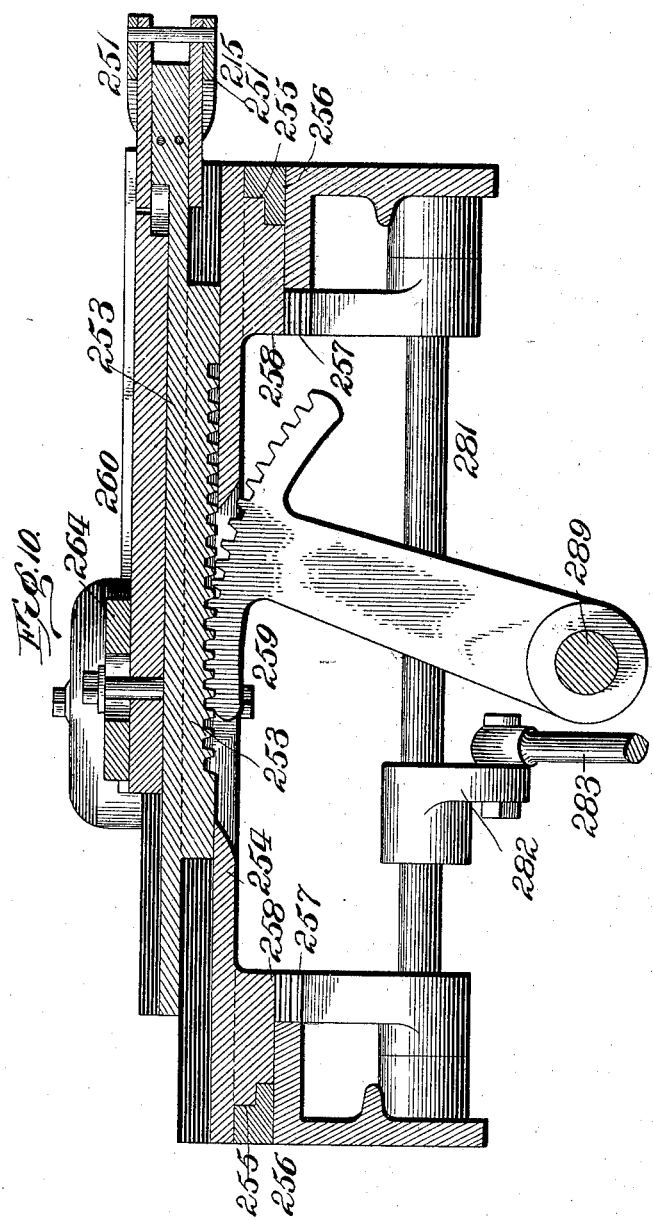
WITNESSES
INVENTOR
William A. Lorenz
by Church & Church
his Attorneys.

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 10.
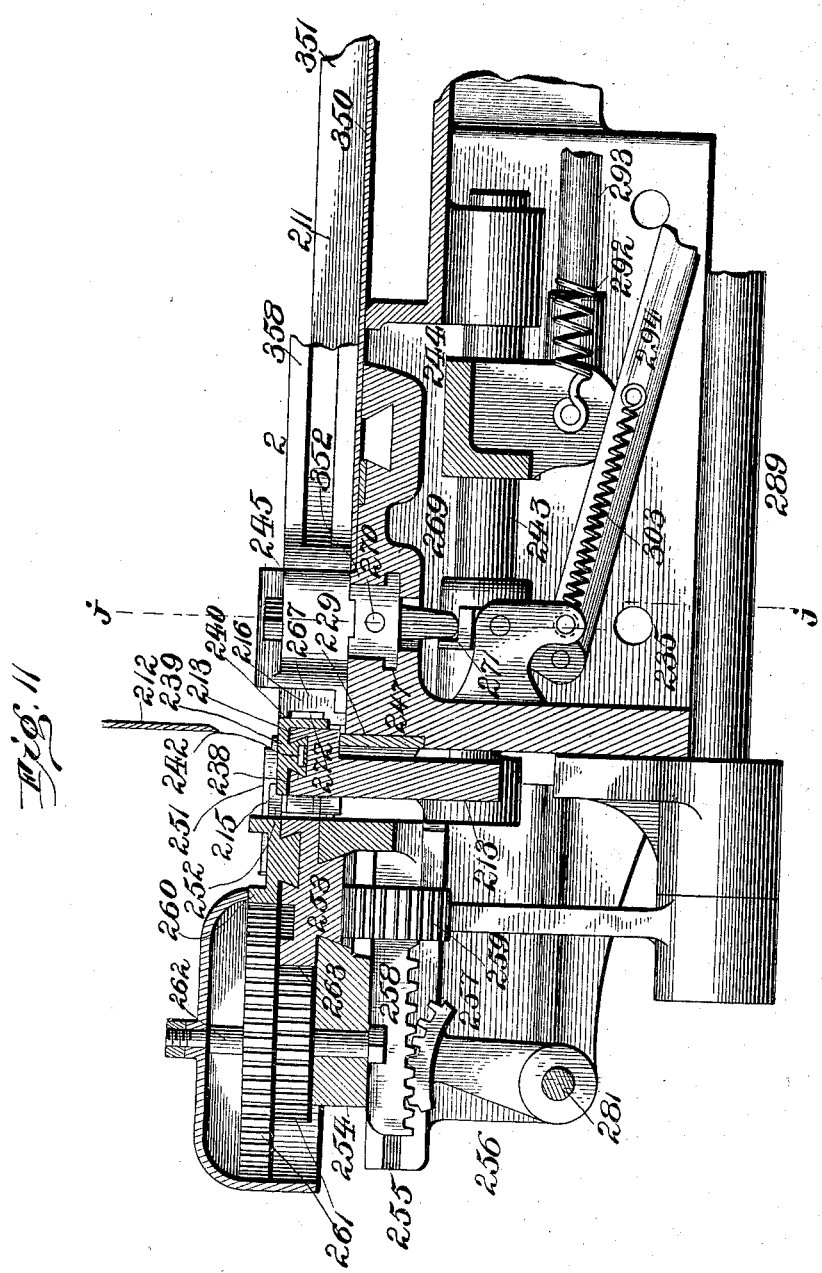
WITNESSES
INVENTOR
William A. Lorenz
Attorneys No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 11.
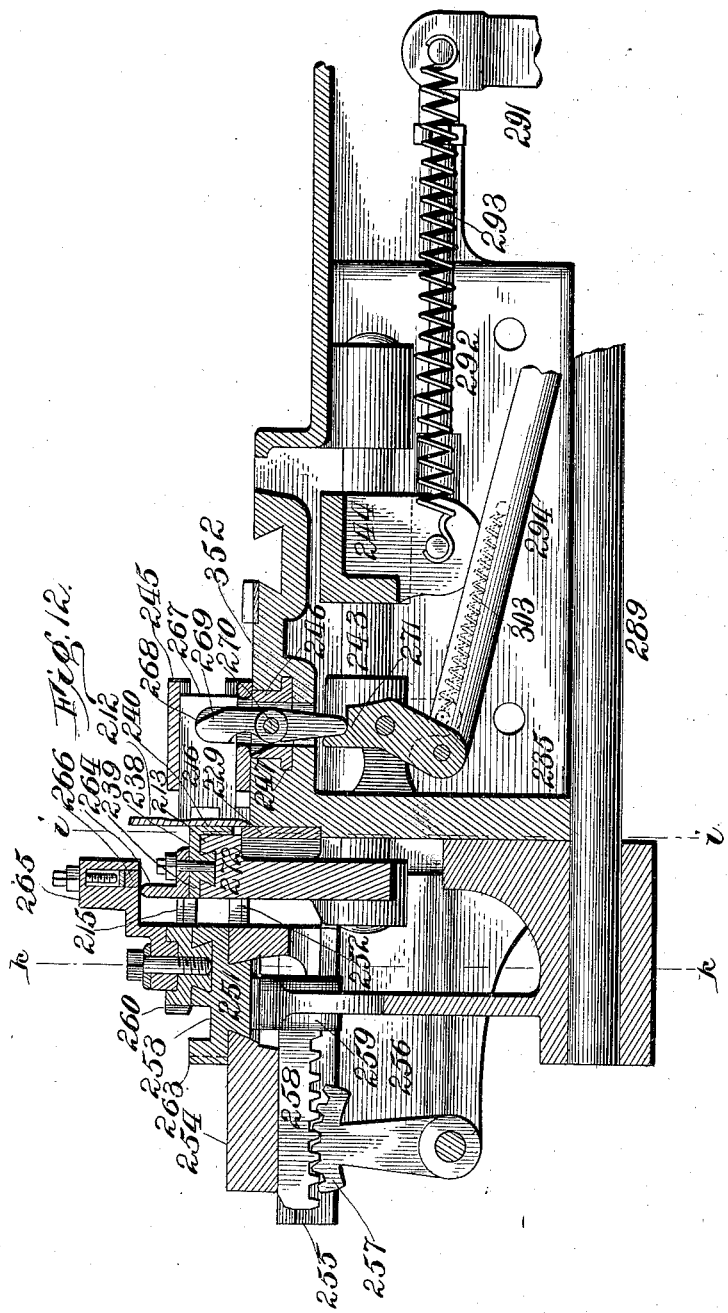
WITNESSES
INVENTOR
William A. Lorenz
his Attorneys.

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 12.
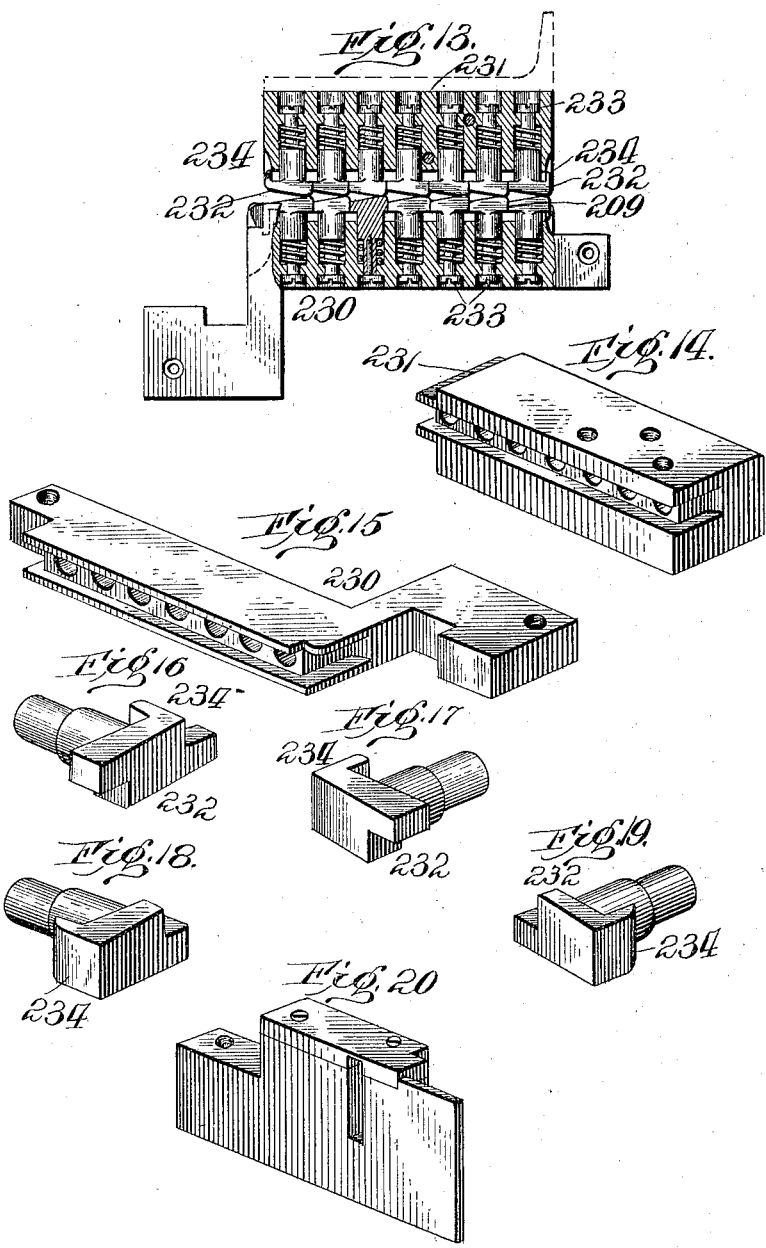

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 13.
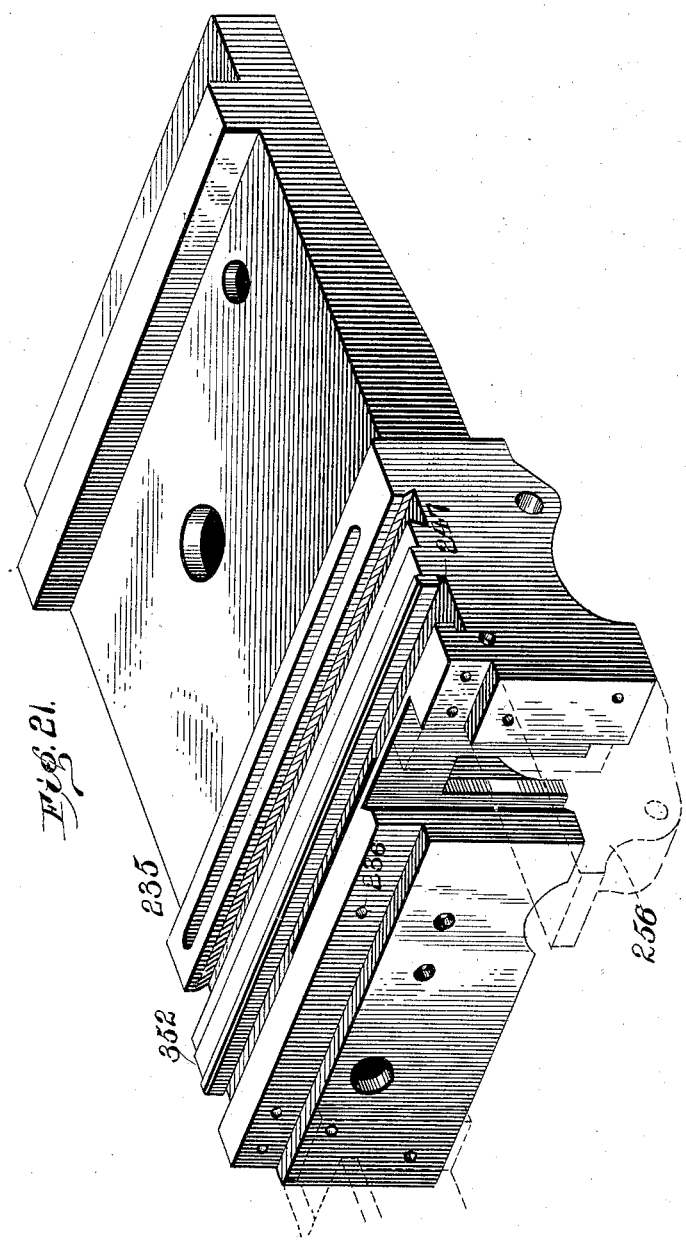

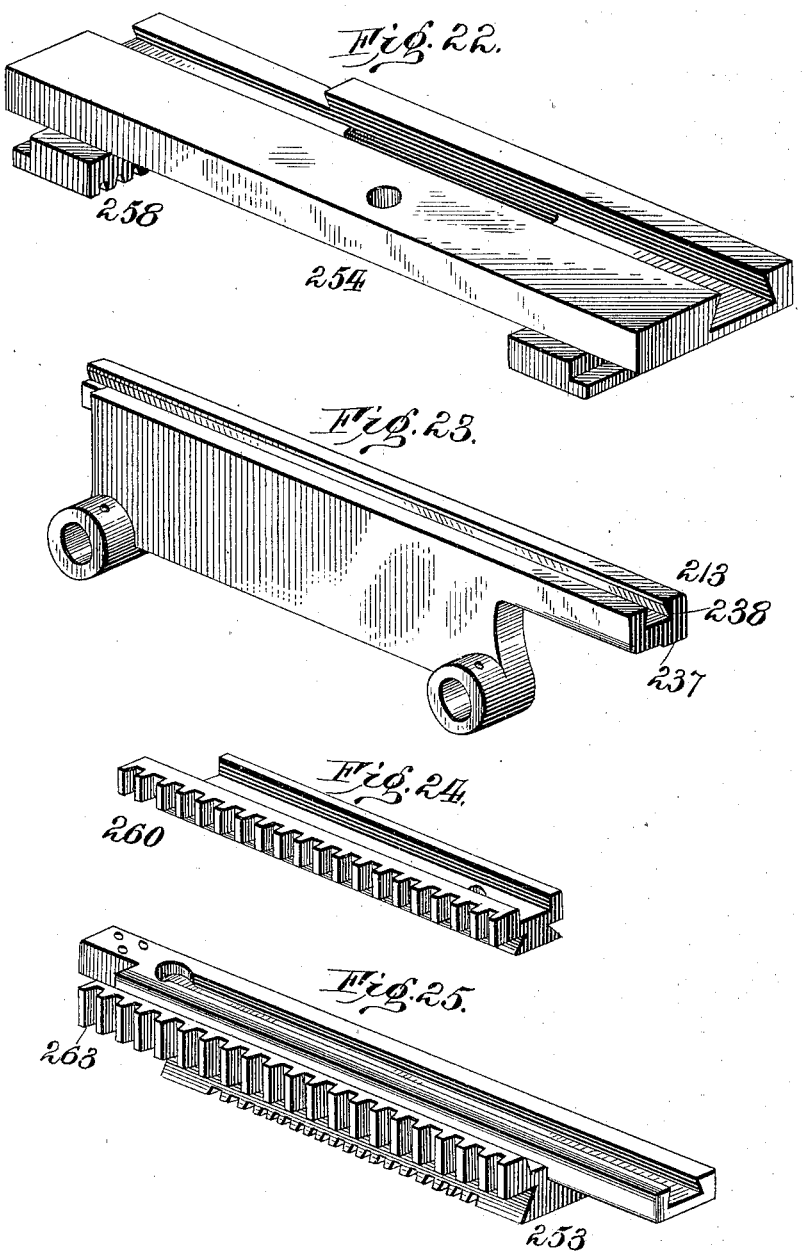

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 15.
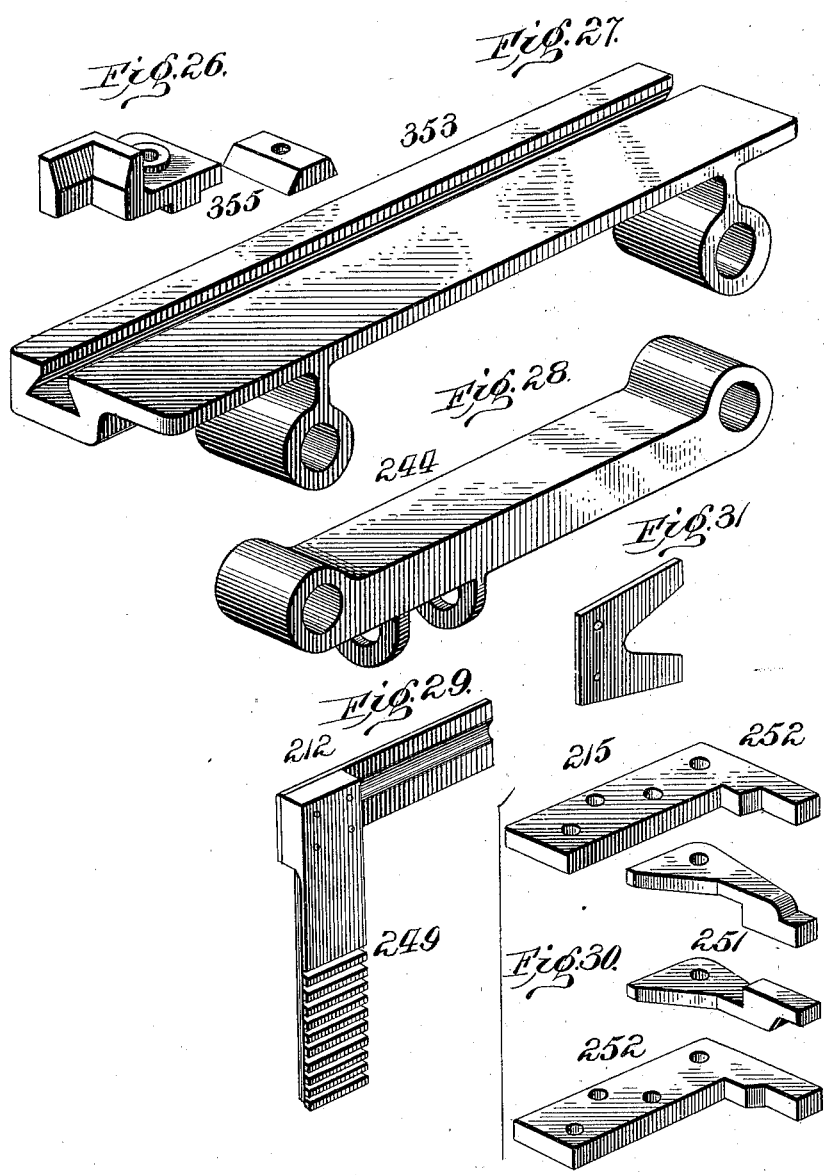
WITNESSES
INVENTOR
William A. Lorenz
Church & Church
Attorneys.

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 16.
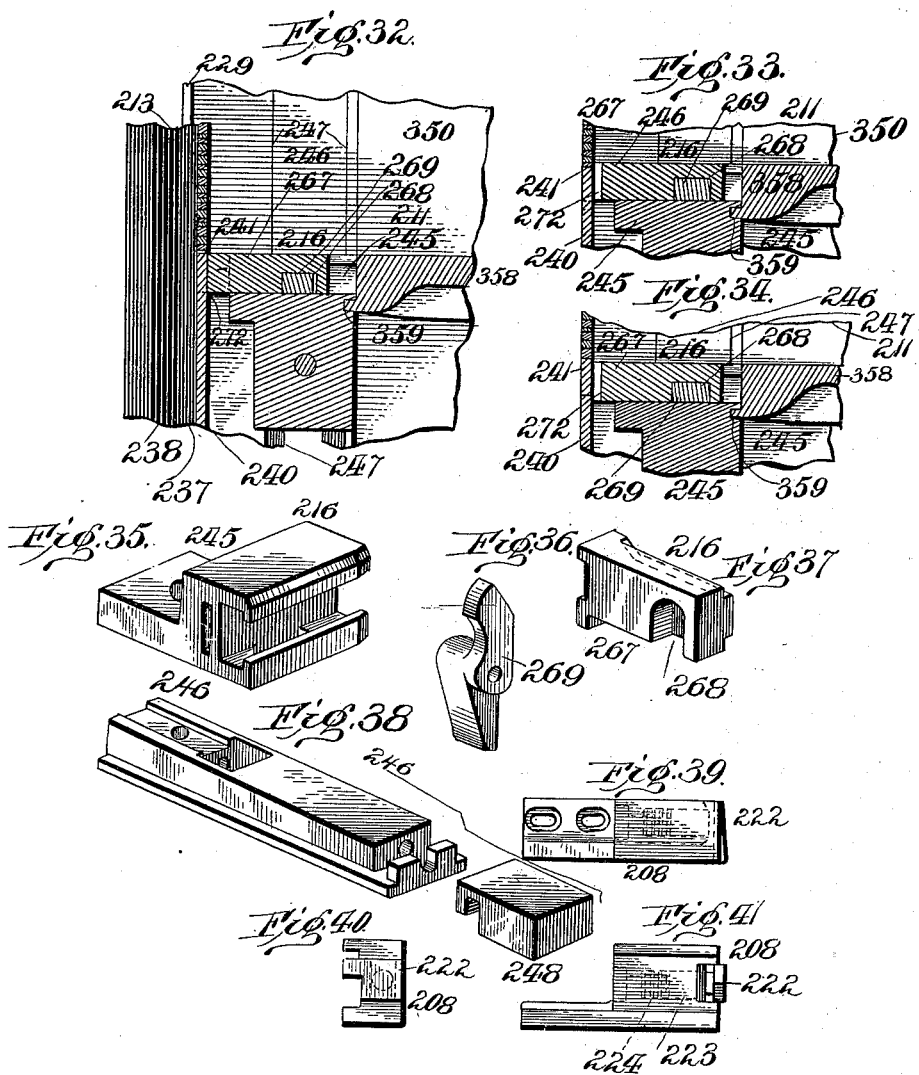
WITNESSES
INVENTOR
William A. Lorenz
Church & Church
his Attorneys.

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 17.
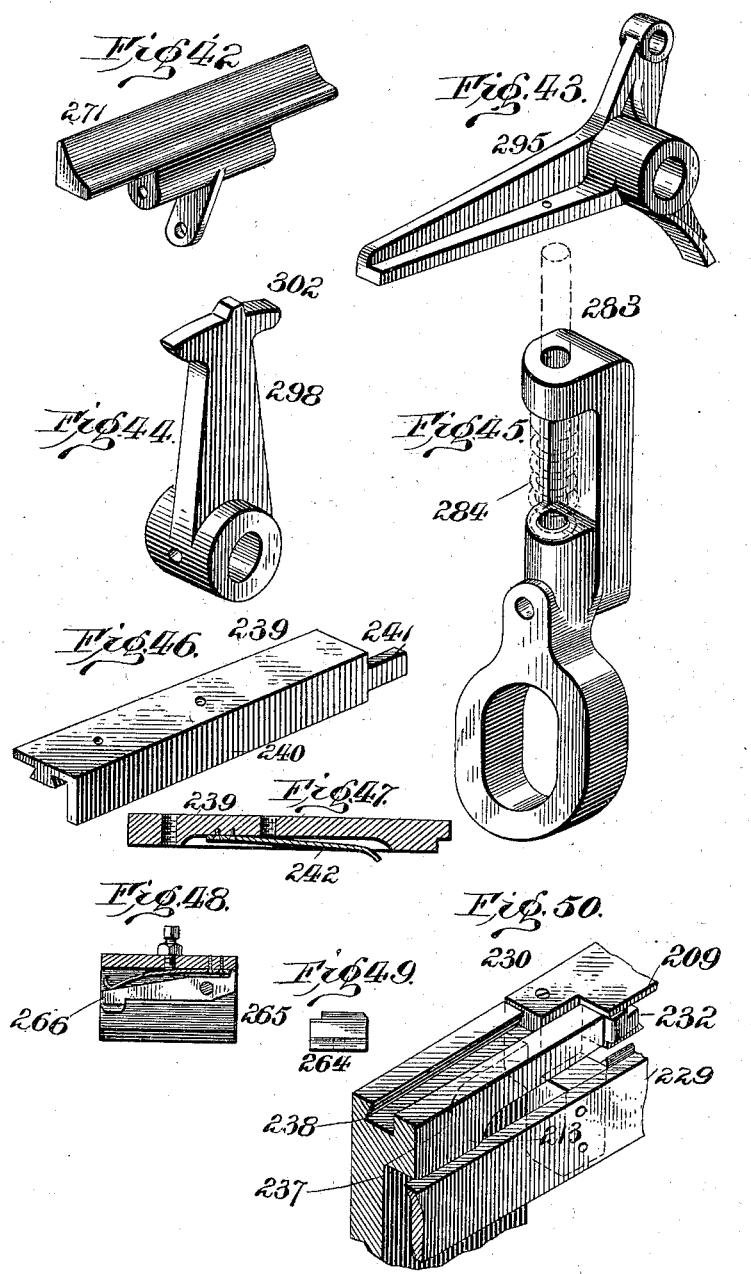
WITNESSES
INVENTOR
William A. Lorenz
Attorneys No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 18.
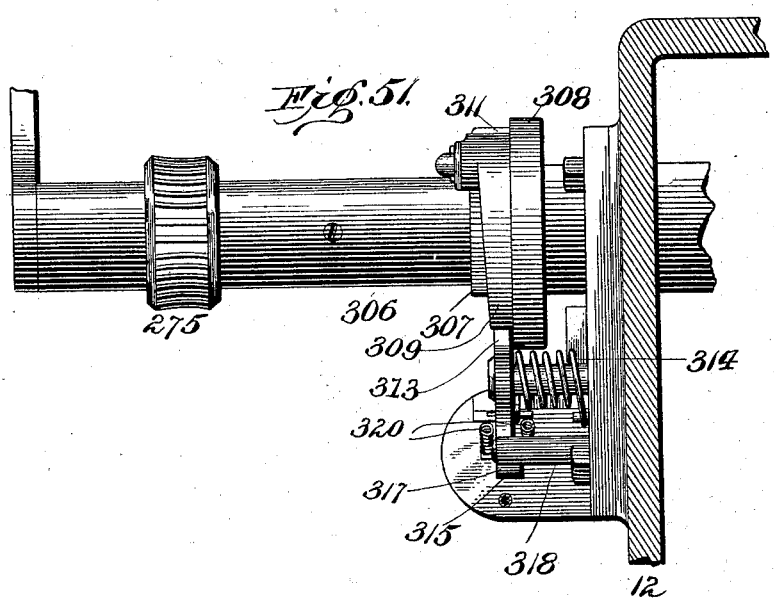
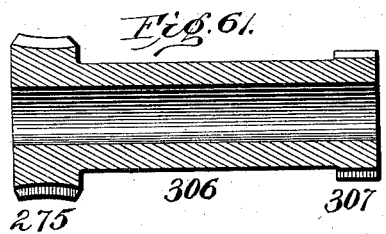
WITNESSES
INVENTOR
William A. Lorenz
by Church & Church
his Attorneys.

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 19.
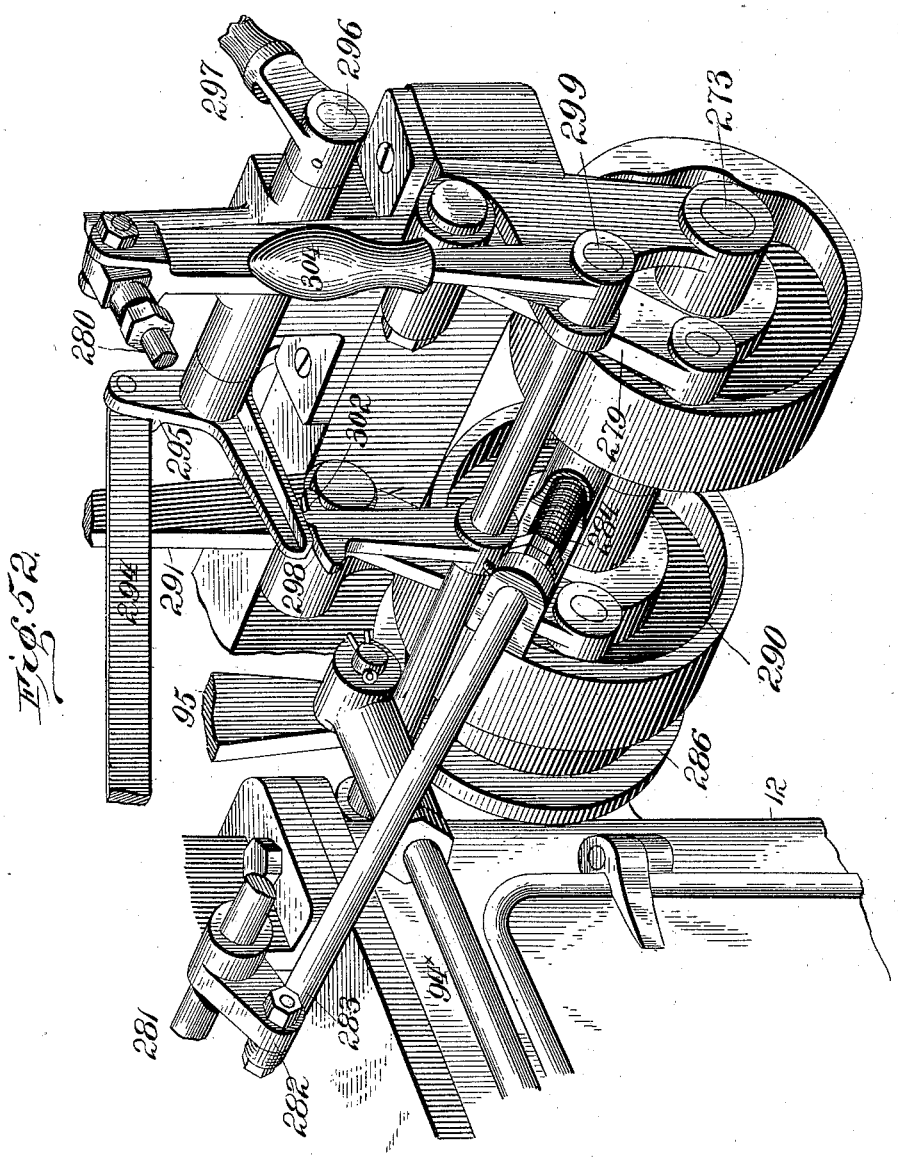

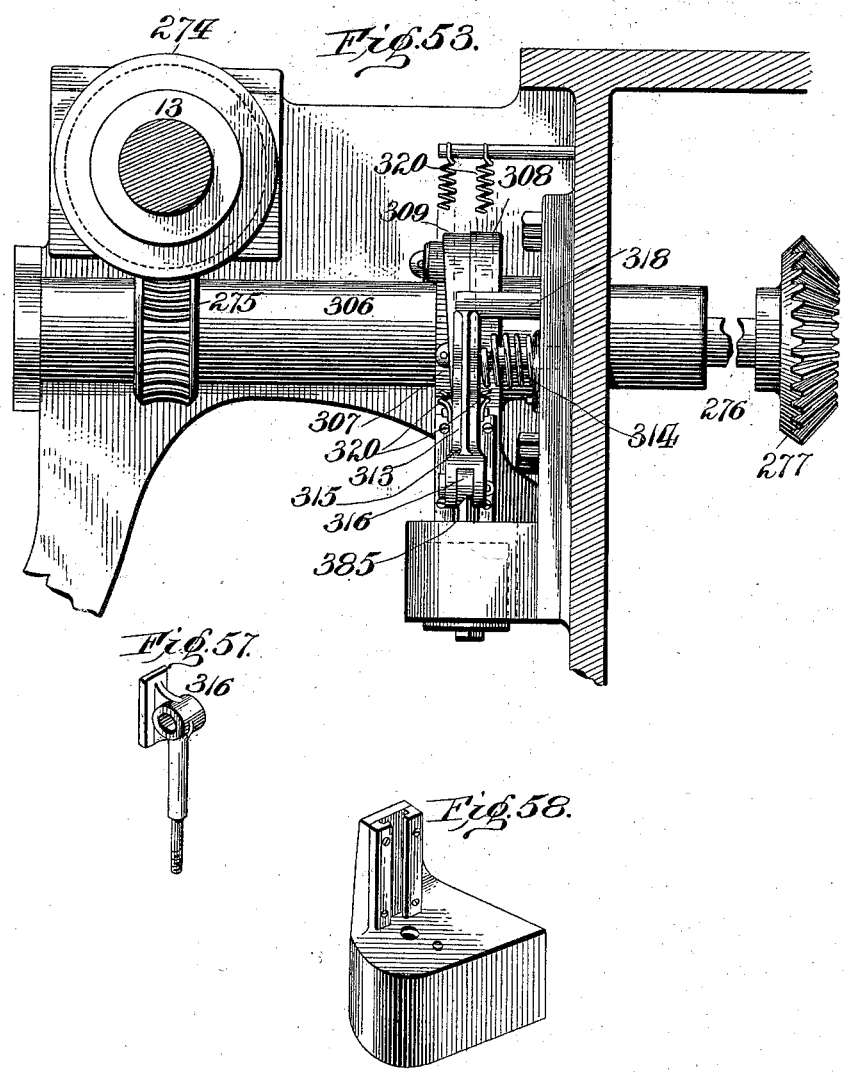

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 21.
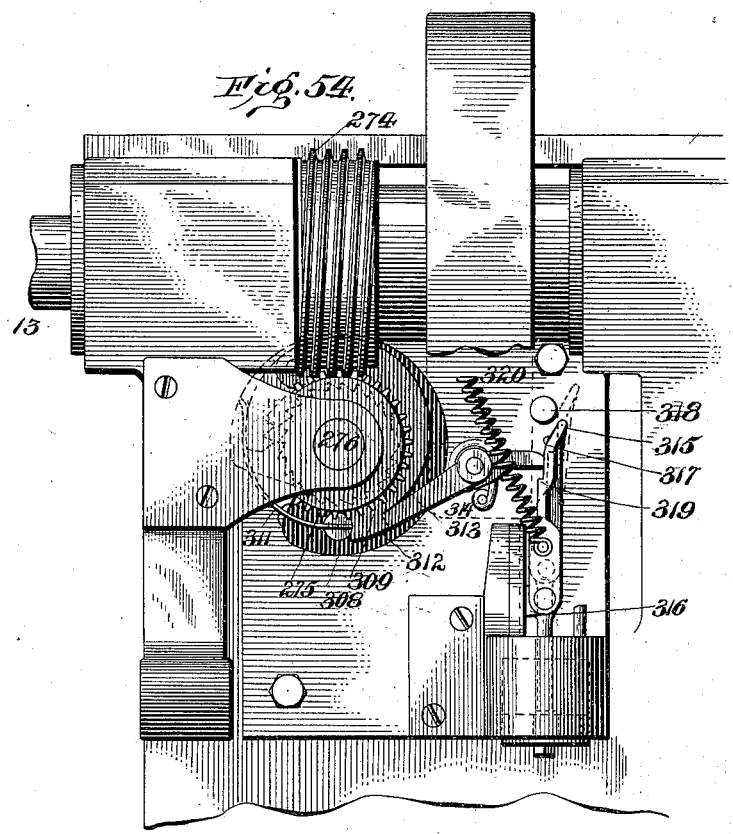
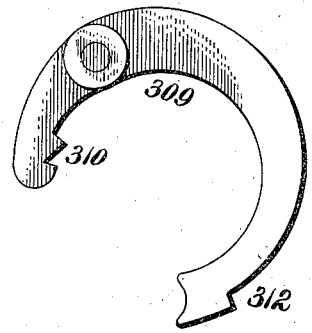
WITNESSES
INVENTOR
William A. Lorenz
Attorneys.
THE NORRIS PETERS CO., PHOTO-LITHO., WASHINGTON, D. C.

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 22.
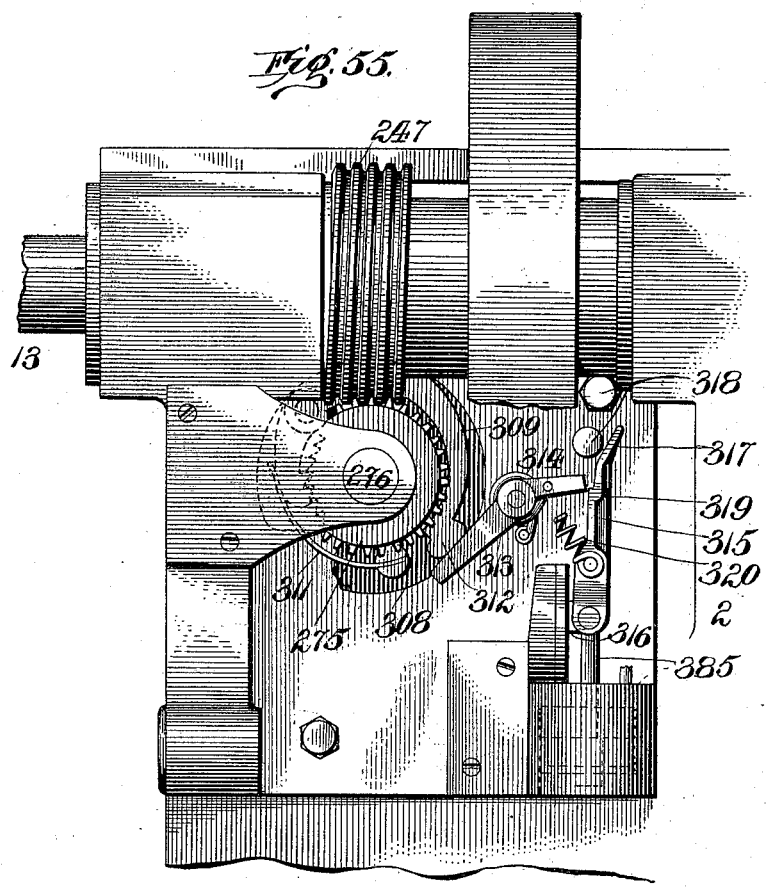
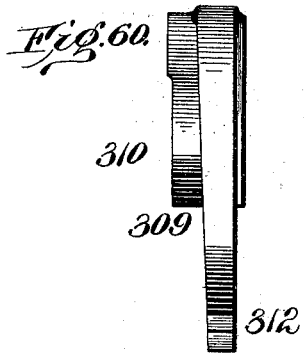
WITNESSES
INVENTOR
William A. Lorenz
Attorneys.

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 23.
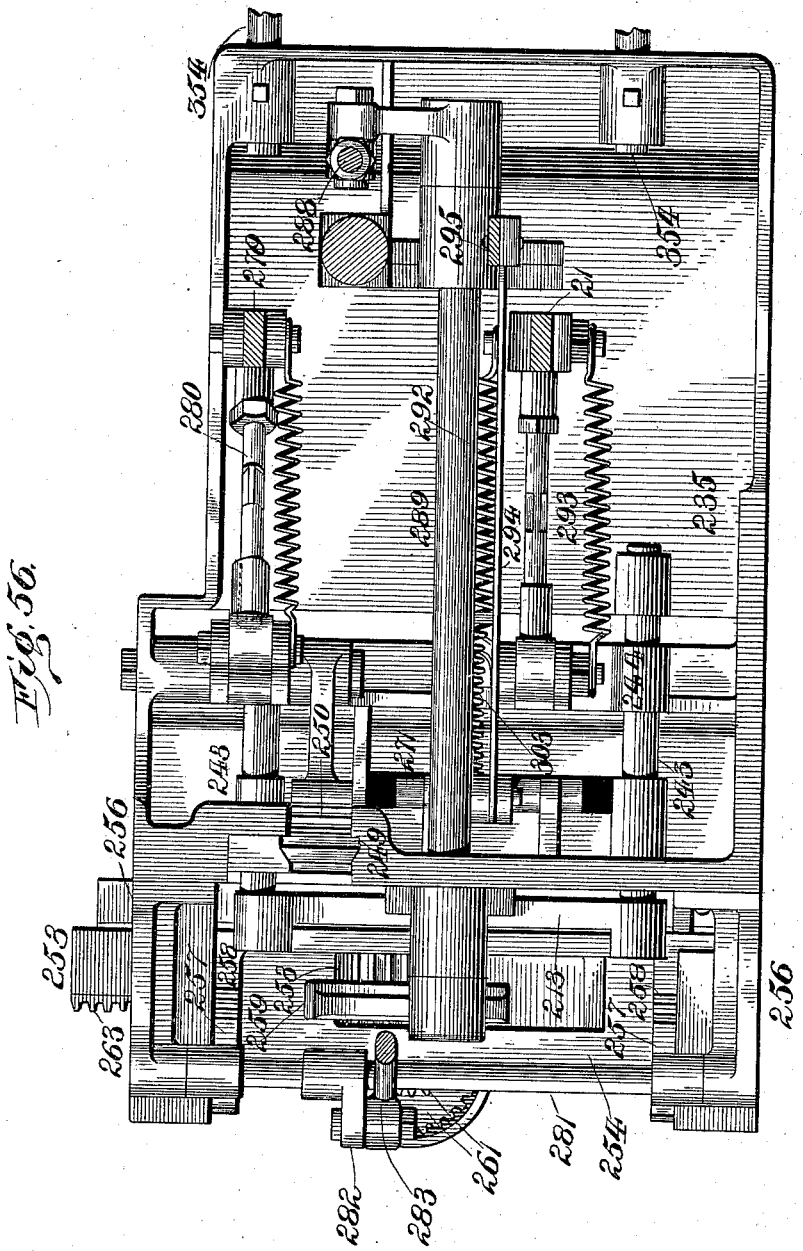
WITNESSES
INVENTOR
William A. Lorenz
by Church & Church
his Attorneys.

No. 625,044. Patented May 16, 1899.
W. A. LORENZ.
GALLEY MECHANISM FOR TYPE MAKING MACHINES.
(Application filed Dec. 31, 1897.)
(No Model.) 24 Sheets—Sheet 24.
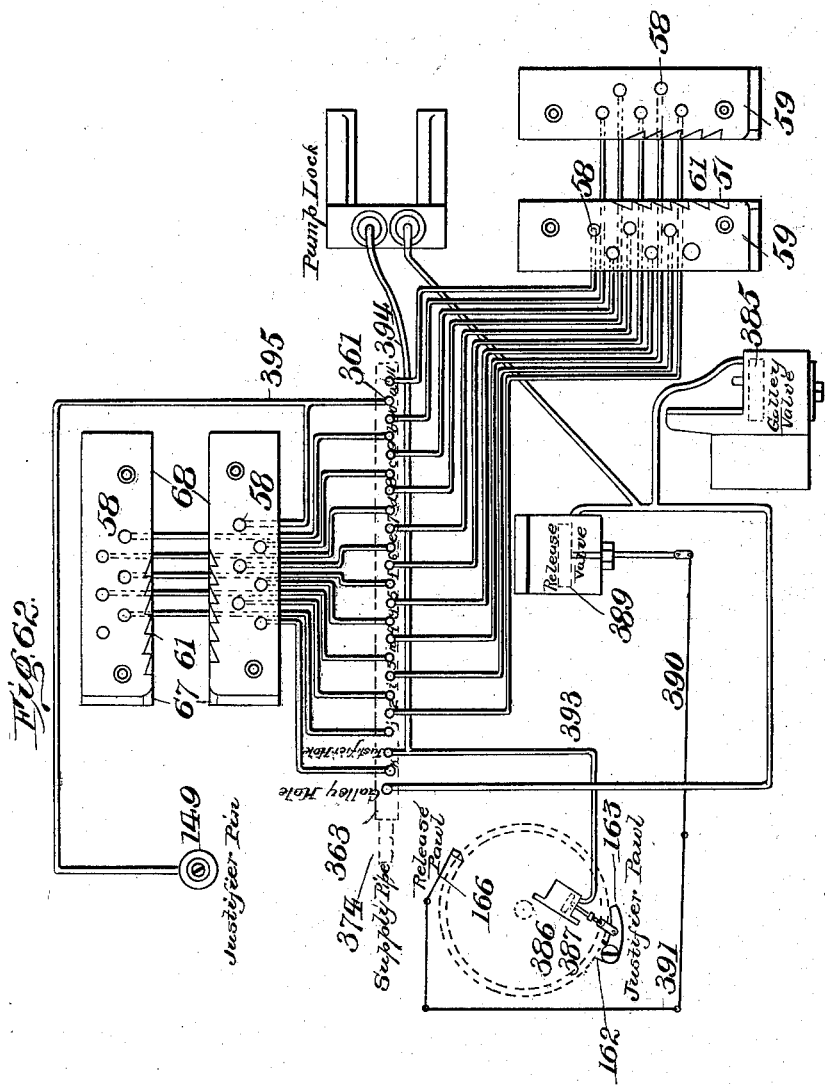

UNITED STATES PATENT OFFICE.

WILLIAM A. LORENZ, OF HARTFORD, CONNECTICUT, ASSIGNOR TO THE LANSTON MONOTYPE MACHINE COMPANY, OF WASHINGTON, DISTRICT OF COLUMBIA.

GALLEY MECHANISM FOR TYPE-MAKING MACHINES.

SPECIFICATION forming part of Letters Patent No. 625,044, dated May 16, 1899.

Application filed December 31, 1897. Serial No. 664,909. (No model.)

*To all whom it may concern:*

Be it known that I, WILLIAM A. LORENZ, a citizen of the United States, residing in Hartford, in the county of Hartford and State of Connecticut, have invented certain new and useful Improvements in Galley Mechanism for Type-Making Machines; and I do hereby declare the following to be a full, clear, and exact description of the same, reference being had to the accompanying drawings, forming a part of this specification, and to the figures of reference marked thereon.

This invention relates to an improved form of galley mechanism specially adapted for use in connection with the class of type making and composing machines represented by the Lanston monotype-machine, but in many particulars applicable to other forms and kinds of mechanism wherein separate types or similar objects are delivered one at a time and subsequently arranged in rows or lines and the latter associated together in column form.

One of the principal objects of the present invention is to provide a competent and reliable means for receiving and sustaining the type necessary to form a given line, to carry that line into position, and to subsequently transfer it to the galley or other receptacle, all these operations being automatically performed without interrupting the delivery of the types from the casting-machine or other source from whence the types are obtained.

In order to illustrate the complete working of my present invention, I have shown it as applied to a Lanston monotype-machine forming the subject of an application, Serial No. 664,974, filed by Tolbert Lanston December 31, 1897, to which reference may be had for a more detailed description of the type-forming mechanism; but in order the better to understand the operation of my improvements in connection with said machine it may be advantageous to briefly outline the Lanston system.

An impression of the composition or matter to be set up is first made upon a record-strip, in which are formed perforations representing the characters, spaces, &c., and at the end of each line of composition is formed one or more perforations representing the amount of space to be added to the bodies of some or all of the types composing the line in order to fill out or justify the line. This record-strip operates as the controlling medium for regulating the operations of the type casting and assembling mechanisms. The casting-machine is equipped with a feeding mechanism for advancing the record-strip, a series of matrices containing the various characters employed, a justifying mechanism for determining the sizes of the types, a mold of which the selected matrix forms a part, a pump for supplying molten metal to the mold to form the type, an ejector for expelling the type from the mold, a type-carrier receiving the type as it is ejected from the mold and serving to transfer the type away from the mold into position to be delivered to the galley mechanism, and a pneumatic controlling system governed by the perforated controlling strip and serving to bring the matrices successively into position to set the justifying mechanism, to connect the justifying mechanism with the adjustable member of the mold at proper intervals, and to control the action of the pump.

When in operation, each revolution of the main driving-shaft represents the production of a single type, and as speed of production is a great desideratum in machines of this class it becomes quite important that a competent and reliable mechanism should be provided not only for properly assembling the type in lines and the lines in column form, but that this work should be done rapidly and so as not to be a check upon the producing capacity of the machine. In other words, it is very desirable that the product of the machine should be removed and taken care of as rapidly as possible and without interference with the main functions of the machine as a producer. My present invention is designed to take care of the product of such a machine and in practice has proved efficient for the purpose; but notwithstanding the fact that it has been specially applied to this machine it will be obvious that it is in the main applicable to other forms of machines wherein separate type are delivered for the purpose of being assembled.

With these preliminary remarks I will proceed to describe the preferred form of embodiment in connection with the accompanying drawings, wherein—

Figure 1 is a view in perspective of a type-casting machine with the improved galley mechanism applied thereto. Fig. 2 is a top plan view, and Fig. 3 an end view, showing the mode of applying the galley mechanism to the casting-machine. Fig. 4 is a plan view of the galley mechanism and a portion of the casting mechanism, including the mold and type-carrier. Fig. 5 is a view in perspective showing the mold, the type-carrier, and a portion of the galley mechanism. Fig. 6 is a view in perspective of a portion of the galley mechanism, including the line transferring and feed mechanisms. Fig. 7 is a top plan view of a device shown in Fig. 6, the galley being represented in dotted lines. Fig. 8 is a vertical section taken on the line $i\,i$, Fig. 4. Fig. 9 is a vertical section on the line $j\,j$, Figs. 7 and 11. Fig. 10 is a vertical sectional view on the line $k\,k$, Fig. 12. Fig. 11 is a vertical section on the line $l\,l$, Fig. 9. Fig. 12 is a vertical section on the line $m\,m$, Fig. 9, but with the parts in a different position from that shown in said last-named figure. Fig. 13 is a sectional view showing the type-supports in the line-channel. Figs. 14, 15, 16, 17, 18, and 19 are details of the type-supporting members. Fig. 20 is a detail showing the guide through which the ejector-blade operates. Fig. 21 is a view in perspective of a portion of the bed-plate for the galley mechanism. Fig. 22 is a detail view of the movable frame or support for the racks of the line-transferrer. Fig. 23 is a detail view of the movable frame for supporting the type-supporting blade and line-feeder. Fig. 24 is a detail view of the rack for returning the type-sustaining blade. Fig. 25 shows the rack-bar for operating the line-carrier and the type-sustaining blade. Fig. 26 is a detail view of one of the corner-blocks of the galley. Fig. 27 is a detail view of the outer support for the galley. Fig. 28 is a detail view of the cross-head through which motion is transmitted to the heads carrying the frame, Fig. 23. Fig. 29 is a detail of the rule or line supporting blade. Fig. 30 is a detail showing the two line transferring or carrying fingers and their brackets for attachment to the rack, Fig. 25. Fig. 31 is a detail of the spring for the line-carrying fingers. Fig. 32 is a partial sectional view showing the automatic stop in normal position to admit a standard line to the galley. Figs. 33 and 34 are partial sectional views illustrating the action of the automatic stop when lines above and below the standard are attempted to be moved into the galley. Figs. 35, 36, and 37 are details of the automatic stop mechanism, showing the support, lever, and sliding block. Fig. 38 is a view of the adjustable support for the automatic stop and the detachable block for filling out the floor at the entrance of the galley to accommodate different lengths of line. Figs. 39, 40, and 41 are top, end, and side views, respectively, of a portion of the type-carrier, showing the type holding or supporting dog. Fig. 42 is a view of the pivoted bar or member acted upon by the automatic stop-lever, Fig. 36. Fig. 43 is the trip-lever operated upon by the automatic stop-lever to shift the belt. Fig. 44 is the arm or segment engaged by the trip-lever, Fig. 43. Fig. 45 is the cam-yoke for operating the sector controlling the line-feed into the galley. Fig. 46 is a detail perspective view, and Fig. 47 a section of the type-sustaining blade for supporting the end of the line as formed. Fig. 48 is a detail view of the resetting-pawl for the type-sustaining blade, Fig. 46. Fig. 49 is a side view of the block carried by the type-sustaining blade and engaged by the resetting-pawl. Fig. 50 is a detail illustrating the manner of supporting the inner end of one of the blocks carrying the type-supports, Fig. 13. Fig. 51 is a bottom view illustrating a portion of the driving devices for the galley mechanism. Fig. 52 is a perspective view of the driving mechanism for the galley devices and a part of the trip mechanism for the belt-shipper. Fig. 53 is a side elevation of the galley-clutch and the gearing for transmitting motion from the main driving-shaft to the shaft of the galley mechanism. Figs. 54 and 55 are end views of the galley clutch mechanism, showing it in two of its operative positions. Fig. 56 is a detail view showing the shaft, clutch and pawl, and stopping and starting lever of the galley clutch mechanism, the trip-lever and cylinder being removed. Fig. 57 is a detail view of the piston-rod and guide for the trip-lever. Fig. 58 is a detail of the cylinder-casing and guide for the piston-rod, Fig. 57. Fig. 59 is a detail view showing the clutch-pawl detached. Fig. 60 is an edge view of the clutch-pawl. Fig. 61 is a sectional view of the worm-wheel, sleeve, and ratchet-wheel. Fig. 62 is a diagrammatic view illustrating the pneumatic controlling system pertaining to the casting-machine and showing its connection with the galley mechanism.

Like numerals of reference in the several figures indicate the same parts.

For the purpose of clearly indicating the connection between my improved galley mechanism and the type-casting machine with which it is associated I have illustrated in Figs. 1, 2, and 3 the general arrangement and disposition of the parts constituting the casting-machine with my improvements applied thereto; but inasmuch as the present invention is in the nature of an adjunct to said machine and its functions pertain principally to the handling of the types as they are delivered from the casting-machine and the connections with the driving and controlling mechanism whereby the movements are inaugurated and properly timed it is not deemed necessary to enter into a detailed description of the type-casting machine further than to designate some of its principal elements. The die-case 26, with its series of matrices, reciprocates above the mold in which the types are formed, said mold being composed of the two stationary walls 80 81, the movable mold-blade and type-ejector 96, and the movable front wall 83. The melting-pot and pump for supplying molten metal to the mold are located to the right of the machine, the nozzle projecting beneath the mold. The main driving-shaft 13 is formed in two sections geared together and supported in bearings on the rear and left-hand side of the frame 12. The stop-pins 58 for controlling the position of the die-case 26 are arranged in rear and to the left of the mold, said stop-pins being controlled by the pneumatic system. The position of the mold-blade 96 for effecting normal adjustment of the mold-cavity to suit the different matrices is controlled by normal wedge 112, while the abnormal adjustments of the mold-blade for effecting justification are produced by the justifying mechanism 135, the latter being provided with the setting-pawl 163, connected with the pneumatic system, and the connecting-pin 149, also controlled by the pneumatic system and operating at the proper intervals to connect the justifying mechanism with the mold-blade, so as to impose upon the normal adjustments of the latter the abnormal adjustments required for justification. The perforated record-strip constituting the prime controlling member of the machine is immediately operated upon by the feeding mechanism 363, the latter being provided with ports and passages registering with the perforations in the record-strip and conducting air under pressure to the various controllable members forming part of the pneumatic controlling system.

By reference to the diagrammatic view, Fig. 62, the arrangement of the pneumatic system will be understood. In this figure, 85 represents the stop-pins for controlling the movements of the die-case in transverse planes. 163 is the justifier-pawl, by means of which the justifying mechanism is adjusted preliminary to the formation of the types for each line. 149 is the justifier-pin, serving to connect the justifying mechanism with the mold-blade, so as to add justification to the selected type. 389 is the piston for operating the release-pawl 166 at the completion of a line of type, preliminary to the resetting of the justifying mechanism. The device marked "Pump-lock" controls the working of the pump for injecting metal into the mold, and 374 represents the supply-pipe through which air under pressure is supplied to such of the passages as are uncovered by the perforations in the controlling-strip. To the foregoing, which pertain to the casting-machine proper, is added the piston 385 for inaugurating the movement of the galley mechanism.

The general operation of the type-casting machine may be briefly described as follows: The controlling-strip is fed to the machine in the reverse order to that in which it is prepared—that is to say, the last line and last character first—in order that the justification for the line may be made in advance of the formation of the type composing that line. The first thing required to be done is to stop the pump and throw the justifier-pawl 163 in engagement with its ratchet-wheel and to so actuate it that it will set the controlling member of the justifying mechanism at the proper angle. This is accomplished by a perforation in the controlling-strip located opposite the port marked "Justifier-hole," the latter communicating with two passages, the one, 393, leading to the cylinder of the justifier-pawl and the other, 394, leading to the pump-lock, so that when air under pressure is admitted through said perforation the justifier-pawl will be thrown into engagement with its ratchet-wheel and the movement of the pump will be arrested. The extent of movement effected by the justifier-pawl is determined by a perforation corresponding in position with one of the lettered ports and communicating with one of the stop-pins 58, the latter regulating the throw of the pawl. When the justifying mechanism has been set, the formation of types for the line is proceeded with and at each revolution of the main shaft one or more of the stop-pins 58 is or are elevated to locate the die-case and bring the proper matrix in position and to adjust the mold, the pump being operated to inject molten metal into the mold and the completed type transferred to the type-carrier by the operation of the mold-blade. These operations are repeated at each revolution of the driving-shaft in forming types of normal widths. When types of abnormal widths, such as space-types, are to be formed suitable for filling out or justifying a line, communication is established with the justifier-pin 149, as by branch pipe 395, thereby connecting the justifier mechanism with the mold-blade to set the latter in proper position to produce a space-type of the required dimensions. At the completion of a line and preliminary to the setting of the justifying mechanism for the next succeeding line it is required that the justifying mechanism should be returned to normal position. This is effected through the medium of the port marked "Galley-hole," which communicates with the pump-lock and release-valve 389, thus stopping the action of the pump and returning the justifying mechanism to zero. This same port is utilized in the present invention for starting the galley mechanism into action, the controlling-piston 385 thereof being in open communication with the passage leading to said galley-hole. It is at this point that communication is made between the pneumatic system of the casting-machine and the galley-operating devices of the present invention, and it need only be borne in mind that after the types composing a line have been cast and discharged from the machine successively in their regular order and upon the return of the justifying mechanism to zero position preliminary to its adjustment for the next succeeding line the controlling member or piston 385 of the galley mechanism is brought into action. There is another point at which the galley mechanism maintains an intimate connection with the casting-machine, and that is where the delivery of the type is effected. In this particular machine the type are not transferred directly from the mold into the receiving-channel of the galley mechanism, but each separate type as it is ejected from the mold by the action of mold-blade 96 is deposited in a type-carrier 208, Figs. 4 and 5, reciprocating in line with the slide 84, carrying the front wall 83 of the mold. This type-carrier is provided with devices for receiving and retaining the type in upright position and presenting it opposite the type-receiving way or channel 209 of the galley mechanism, into which latter the type is transferred by an ejector-blade 210. It is at this point where the type is ejected from the type-carrier that the type may be said to be discharged from the casting-machine and delivered to the galley mechanism.

We come now to consider the galley mechanism proper in its preferred form for adaptation to this machine. The principal elements or features aside from the actuating mechanism include the type-receiving way or channel 209, with its means for supporting the type while a line is being assembled, a line-carrier 215, operating to shift the completed line and bring it into position to enter the galley, a movable rule or gate 212 for alternately opening and closing the entrance to the galley, and the automatic stop or trip mechanism 216 for stopping the machine in the event the line is either too long or too short as compared with the standard to which the machine is set.

The type-channel 209 extends across the end or entrance to the galley 211 and is separated therefrom by the vertically-movable blade or rule 212, the latter forming one side of the channel, while the opposite side is formed by a movable head or line-transferrer 213. A type-sustaining blade 241, traversing in the type-channel 209, serves as a support for the first type delivered in the channel and is caused to retreat as each additional type is delivered to the channel. Upon the completion of the line the carrier 215 is projected beyond the last type and the whole line is moved in the channel until it arrives opposite the entrance or mouth of the galley. The rule 212 is then elevated and the line-transferrer 213 is advanced in a direction to force the completed line of type into the galley, after which rule 212 partly descends to hold the type in position, the head 213 is withdrawn, the rule 212 completes its movement, and the operations are repeated for the next line. Should the line be either too long or too short, the automatic stop or trip mechanism 216 will be brought into action to shift the belt and stop the machine; but if the line is of normal length it will pass the automatic stop without interfering with the running of the machine.

The galley mechanism is mounted upon a bed-plate or frame 235, Fig. 21, detachably secured to the front side of the main frame 12. At 236, Figs. 8 and 21, is secured a bar 229, forming the bottom of the type way or channel, and on either side of said channel, at the entering end thereof, are arranged two blocks or frames 230 and 231, forming the side walls. These blocks 230 and 231 are grooved longitudinally along their proximate faces, Figs. 13 to 15, and each is furnished with a series of seats for the reception of spring-pressed holding-dogs or type-supporting members 232, Figs. 16 to 19. Each dog 232 is provided with a limiting-screw 233, and its outer or engaging face is slightly inclined, as shown in Fig. 13, to facilitate the passage of the types and assist in retaining them in an upright position, and the vertical joints between contiguous dogs are interrupted by providing said dogs with overlapping sections, whereby the catching of the type by their edges in a manner to impede their passage or disturb their proper position is avoided. The dogs located at opposite ends of the blocks are also provided with rearwardly-projecting shoulders 234, working in recesses in the blocks and forming guides to insure the proper entry of the type in the channel.

The line-transferrer 213, Fig. 23, stands normally in line with the block 230 and constitutes a portion of one wall of the type-channel. It comprises a vertical web or plate having an overhanging portion or flange 237, whose lower edge is in line with the upper edge of bar 229, Fig. 11, whereby said head is adapted to move transversely above said bar. In the upper face of said head or line-transferrer 213 is formed a groove 238 for the reception of the dovetail portion of the type-sustaining slide 239, said slide being provided with a vertical flange 240, extending into the type way or channel and carrying a projection or type-sustaining blade 241 at its rear end or that end nearest the type-carrier. The end 241 of this slide 239 serves as a sustainer for the types as they are forced from between the rearmost holding-dogs 232, and in order to retard its movement and prevent accidental displacement an adjustable friction-spring 242, working against the bottom of the groove 238, is arranged to exert the required frictional resistance to the movement of said slide to sustain the line of types and at the same time permit the sustaining-blade to retreat as the types are advanced by the line-carrier 215. Head 213 is attached to two parallel rods 243, mounted to reciprocate in bearings in the frame and provided with a cross-head 244, through which motion is communicated to said head in a direction transverse to the type-channel.

The end of block 231 constitutes one side of the mouth or entrance to the galley, the opposite side of said entrance being formed by a block 245, Figs. 32 to 35, detachably secured to a slide 246, movable in ways 247 in the face of galley-frame 235. This slide 246 is provided with a detachable end section 248, Figs. 9 and 38, fitting within the groove between ways 247, to provide a level floor over which the types may pass into the galley and so arranged that when slide 246 is adjusted to receive longer or shorter lines of type other sections 248, but of a length adapted to fill the interval, may be substituted.

The vertically-movable rule or blade 212, Figs. 9, 11, 12, and 29, which forms the wall of the type-channel opposite head 213 and closes the entrance to the galley, is attached at one end to a vertical rack-bar 249, supported in guides in the frame and engaged by a segmental gear 250. As before described, this rule or blade 212 occupies its lowermost position (indicated in Fig. 12) when the line of types emerges from between the holding-dogs 232 into that part of the type-channel extending between said blade and the head 213; but as soon as the completed line of types is brought opposite the galley-entrance, pushing slide 239 before it, blade 212 is elevated to the position shown in Fig. 11 and head 213 is moved to the right, thereby shoving the line of types beneath blade 212 into the galley-entrance, after which blade 212 makes a partial descent in rear or to the left of the line of types to prevent them from falling or becoming disarranged, the head 213 is retracted, and blade 212 completes its downward movement and again occupies the position indicated in Fig. 12.

The principal object in employing line-carrier 215 is to enable the transfer of the completed line from the receiving way or channel 209 to the galley without interrupting the formation and assembling of types for the next succeeding lines. It is furnished with fingers 251, which at the completion of a line are projected behind the last type of the line and moved longitudinally of the type way or channel 209 up to a point opposite the rear wall of the entrance to the galley, after which they are moved to the left and carried back in a different vertical plane, so as to escape the types supported between holding-dogs 232, when they are brought to rest in position to enter behind and engage the next completed line of types. The fingers 251, Fig. 30, are pivotally supported on plates 252, secured to the rear end of a sliding rack-bar 253, Fig. 25. Said rack-bar is supported to reciprocate parallel with the type way or channel in guides formed in a plate or frame 254, Figs. 10, 11, and 12, the latter mounted in ways 255, formed in extensions 256 of galley-frame 235. The ways 255 are at right angles to the guides in which rack-bar 253 reciprocates. Hence the movements of frame 254 are in a direction to carry the rack-bar and fingers transversely of the type-channel for bringing the ends of fingers 251 into or out of engagement with the type. The necessary reciprocating movements of frame 254 are communicated through gear-segments 257, engaging the racks 258 on the under side of said frame, while the longitudinal movements of the rack-bar 253, carrying the fingers, are in like manner produced by a gear-segment 259 engaging said rack-bar. By properly timing the movements of the gear-segments 257 and 259 the fingers 251 will be carried behind the last type of the completed line and by a longitudinal movement of said rack-bar be made to shift the line of types into position in front of the galley, then by a movement of frame 254 withdraw the fingers from the type-channel and hold them withdrawn while they are being returned in position to engage the next succeeding line of types when completed. As the line of types is drawn forward opposite the galley slide 239, which by its projecting end or type-supporting blade 241 supports the front end of the line, is forced longitudinally beyond the front wall of the galley-entrance, and it becomes necessary to return said slide and leave it in position to receive the next succeeding line of types. The mechanism for returning said slide is mounted upon frame 254. It includes a rack-bar 260, Fig. 24, reciprocating longitudinally of rack-bar 253 and driven from the latter through gears 261, Fig. 11, supported on a vertical shaft 262, secured to the frame 254. The lower and smaller gear 261 engages a rack 263, formed on the side of rack-bar 253, while the upper and larger gear 261 engages the teeth formed on rack-bar 260, the object being to effect an increased motion of rack-bar 260 as compared with that of its driver 253. Upon slide 239 is secured a block 264, and to rack 260 is secured a block 265, Figs. 12 and 48, provided with an overhanging portion carrying a dog 266, Fig. 49, held projected by an adjustable spring. When the parts are in position represented in Figs. 4, 8, and 12, the dog 266 occupies a position to one side of block 264, so that the latter is free to pass the pawl as it is driven back by the type. Frame 254 being moved to bring fingers 251 behind the last type of the line, the movement of rack-bar 253 to cause the fingers to transfer the line opposite the galley-entrance will, through gears 261, cause a farther traverse in the same direction of the dog 266, bringing the latter beyond block 264. After the line has been transferred to the galley and the head 213 has returned to position frame 254 moves to the left until dog 266 is brought in alinement with block 264 on slide 239, and while the parts occupy these relative positions rack-bar 253 is moved rearward or toward the type-carrier, causing dog 266 to engage block 264 and carry slide 239 back to normal position, after which frame 254 is moved to the right sufficiently to carry dog 266 out of alinement with block 264, without, however, causing fingers 251 to enter the type-channel.

Block 245, constituting the adjustable front wall of the galley-entrance, is furnished with a horizontally-movable section 267, Figs. 11, 12, and 32 to 37, inclusive, forming part of the automatic stop mechanism for arresting the motion of the machine in case the line fed to the galley is either too long or too short. The movable section or trip-block 267 is fitted to guides in the rear face of block 245 and is provided with a recess 268, in which is received the head of a lever 269, the latter pivotally supported upon a pin 270, extending longitudinally of the adjustable supporting-slide 246. The lower end of lever 269 is engaged by a wide lever 271, Fig. 42, pivoted in the frame, and through this last-named lever the movable section 267 operates upon the belt-shifter, as hereinafter explained. The portion of lever 271 which engages lever 269 is made sufficiently wide to accommodate various adjustments of block 245. The end of movable section 267 facing type-channel 209 is provided with a horizontal groove or recess 272, adapted to receive the reduced portion or projection 241 on the vertical flange 240 of slide 239, and said movable section 267 rests normally with its grooved end just to one side of the rule or blade 212 when in its lowermost position, as shown in Fig. 12. If the line of types drawn to position in front of the galley-entrance by line-carrier 215 is of normal or standard length, the projection 241 of supporting-slide 239 will be brought in line with the inner or rear face of movable section 267, as shown in Fig. 32, so that when slide 213 is moved to push the line into the galley projection 241 will enter the groove or recess 272 and the line will be advanced without changing the position of the movable section 267. If the line is above the normal or standard length, one or more of the types will be carried opposite the grooved end 272 of movable section 267, (see Fig. 33,) so that when head 213 is moved in a direction to push the line into the galley-entrance the intervening type or types will cause the movable section 267 to be forced back, thereby setting the automatic stop mechanism in action. The same effect will be produced if the line is too short, as under such circumstances the wider portion of vertical flange 240 will stand in front of the movable section 267, (see Fig. 34,) forcing the latter back as head 213 advances.

The galley 211, onto which successive lines of types are delivered as they emerge from between the side walls of the galley-entrance, comprises a detachable frame open at one end and provided with a flat bottom 350 and raised margins 351, Figs. 1, 2, and 3. The open end of the galley rests upon the ribs 352 of galley-frame 235, while the outer or right end is supported upon cross-bar 353, Fig. 27, adjustably supported upon rods 354, attached to galley-frame. The cross-bar 353 is provided with a grooved way to receive adjustable corner-blocks 355, Figs. 1, 2, and 26, for sustaining the right end of galley in position, the left end of galley being held between a stop 356 on block 231 and an adjustable block 357, seated in a groove in the galley-frame. The bottom 350 of the galley is flush with the surface of slide 246, its detachable section 248 forming the bottom of the galley-entrance, so that no obstruction will be presented to the movement of the type onto the galley. To accommodate the galley to lines of different lengths, it is provided with a removable and adjustable bar 358, one end of which is provided with a vertical rib 359, engaging a groove in adjustable block 245 for maintaining the inner face of said bar 358 in alinement with the inner face of block 245, while the opposite end of said bar 358 is attached to a block 360, adapted to be fastened in adjusted position upon cross-bar 353.

The various movements given to the several parts of the galley mechanism are derived from a counter-shaft 273, arranged at the right-hand side of the machine, as indicated in Figs. 1 and 3. This counter-shaft 273 receives motion from a worm 274 on the left section of main driving-shaft, Fig. 2, engaging a worm-wheel 275 on a shaft 276, the latter connected through beveled gears 277 with the rear end of shaft 273, whereby the speed of said counter-shaft 273 is very much reduced. A cam 278, acting on lever 279, the latter connected by link 280 with segmental gear 250, Figs. 1, 9, 52, and 56, controls the vertical movements of the rule or blade 212. The gear-segments 257, which operate frame 254, carrying the line-carrier 215 and type-sustainer 214, are mounted upon a shaft 281, Fig. 51, and said shaft is provided with an arm 282, to which is attached one end of a rod 283, Fig. 53, provided with a compression-spring 284 and driven by the cam 285, Fig. 3, on the counter-shaft 273. The longitudinal reciprocations of the line-carrier 215 are produced by a cam 286, Figs. 1, 3, and 53, acting upon lever 287, the latter connected by a link 288 to an arm on shaft 289, extending longitudinally beneath the galley and carrying gear-segment 259, engaging rack-bar 253, to which latter fingers 251 are attached. The reciprocating movements of head 213 are derived from the cam 290, Fig. 53, on counter-shaft 273, said cam acting on a lever 291, whose upper end, Fig. 12, is connected to cross-head 244 through a yielding connection formed by spring 292 and rod 293, the latter pivotally connected at one end to lever 291 and having its opposite end loosely fitted within a sleeve pivoted to cross-head 244.

It will be remembered that the movable section or trip-block 267 of the automatic stop mechanism when displaced either by the engagement of the type-sustaining blade 214 or by the types themselves acts through its lever 269 upon lever 271. This lever 271 is connected by a bar 294 to a lever 295, Fig. 52, attached to a shaft 296, the latter provided with a handle 297. The other arm of lever 295 rides upon a segment 298, carried by a shaft 299, which latter controls the belt-shipper 300 through an arm 301. The segment 298 is provided with a shoulder 302, which is engaged by a lever 295 when shaft 299 is turned to a position to carry the belt upon the fast pulley, said lever 295 being held in position to engage shoulder 302 by spring 303, Figs. 12 and 51, engaging bar 294, so that when shaft 299 is turned by its hand-lever 304 or otherwise to start the machine the driving-shaft is continued in motion so long as lever 295 retains its position behind shoulder 302 of segment 298. When, however, lever 295 is rocked either through movable section 267 of the automatic stop mechanism or by the hand-lever a spring 305, acting upon the belt-shipper, will transfer the latter from the fast to the loose pulley, and thus arrest the driving-shaft.

As the galley mechanism is brought into action only upon the completion of a line of types, it is desirable that means should be provided for controlling the time and duration of its movements. A special form of mechanism for this purpose is illustrated in Figs. 53 to 61, inclusive. The worm-wheel 275, receiving motion from the worm on the left section of the main driving-shaft, is formed upon or secured to a sleeve 306, mounted to turn loosely upon shaft 276, through which latter motion is communicated to counter-shaft 273 of the galley mechanism. This sleeve 306 is provided with ratchet-teeth 307, while shaft 276 has secured to it a head 308, carrying a pivoted pawl 309, whose teeth 310 are adapted to engage the ratchet-teeth 307 for connecting the continuously-rotating sleeve 306 with shaft 276, so as to cause them to rotate together and actuate the galley mechanism. It is important that shaft 276 should always start from the same position. Hence means have been provided for controlling the engagement of pawl 309 with ratchet-teeth 307 and for effecting its disengagement and the stopping of shaft 276 at the end of each complete movement of the galley mechanism. A spring 311 is arranged to bear upon the toothed end of pawl 309, acting thereon in a direction to effect the engagement of said pawl with the ratchet-teeth and to maintain such engagement. The pawl itself is segmental in form, and its tailpiece is provided with a shoulder 312, adapted to be engaged by one arm of a lever 313. A spring 314 is arranged to hold lever 313 in engagement with the outer face of pawl 309 and in position to engage shoulder 312 thereon, so that pawl 309 having once been caused to engage ratchet-teeth 307 on sleeve 306, thereby starting shaft 276 in motion, the latter will continue to revolve until shoulder 312 on pawl 309 engages the point of lever 313, when the pawl will be swung on its pivot to cause its withdrawal from the ratchet-teeth, and shaft 276 will be arrested and held by the contact of lever 313 with the shoulder on the pawl. In order to start the galley mechanism, it is only necessary to oscillate lever 313 upon its pivot, so as to release pawl 309, whereupon motion will be at once transmitted through the pawl to shaft 276 and the galley mechanism; but it is desirable that the lever 313, after having effected the engagement of the pawl with the ratchet-teeth, should be at once placed in position to arrest the movement of shaft 276 and insure the stopping of said shaft at the completion of one revolution. With this end in view a trigger 315 is employed. This trigger is pivotally attached at its lower end to a vertical slide 316 and is provided near its upper end with an incline 317 for engagement with a fixed pin 318 and with a shoulder 319 for engagement with lever 313. A spring 320 is arranged to hold the trigger 315 normally in elevated position, as indicated by dotted lines in Fig. 54, the incline 317 riding against pin 318 to swing the trigger away from lever 313, and the shoulder 319 being elevated above said lever the latter is free to either ride upon or engage shoulder 312 on pawl 309. When it is desired to start the galley mechanism, slide 316 is drawn down and released, whereupon spring 320 will quickly elevate said slide, causing shoulder 319 to engage lever 313 and withdraw it from shoulder 312 on pawl 309, thus starting the pawl and shaft 276 in motion, and the continued vertical movement of the trigger 315 will effect an engagement of its inclined portion 317 with the fixed pins 318, thereby swinging said trigger to one side and withdrawing its shoulder 319 from engagement with lever 313, thus liberating said lever 313 and permitting it to swing back toward pawl 309 in position to reëngage shoulder 312, and thus arrest the galley mechanism.

Slide 316 is provided with a piston 385, working in a cylinder, the latter communicating with the pneumatic system of the casting-machine, as hereinbefore explained and as illustrated in Fig. 62, so that at the completion of a line of types said slide will be quickly depressed and immediately released, thereby setting the galley mechanism in action and causing the completed line to be carried opposite the galley and then transferred bodily into the galley, the movements of the mechanism continuing through a complete cycle and terminating when the parts have been brought back to the normal or initial position, ready to dispose of the next succeeding line.

The action of the galley mechanism in no way interferes with the work of the casting-machine, the latter continuing to form the types for the next succeeding line and delivering them, one at a time, to the type-channel, where they accumulate until the line is completed, ready to be removed by the galley mechanism, as before.

Having thus described my invention, what I claim as new, and desire to secure by Letters Patent, is—

1. In a machine for forming and setting up lines of type, the combination with the mold and reciprocating type-carrier; of a galley mechanism provided with a line-channel into which successive type are delivered from the type-carrier; said line-channel being provided with type-sustaining devices, a vertically-movable rule or blade and a laterally-movable head or line-transferrer; a galley opposite said line-transferrer; and a line-carrier operating longitudinally of the line-channel to transfer the completed line opposite the line-transferrer in position to enter the galley.

2. In an organized type making and composing machine the combination of the following elements, to wit; an automatic type-forming mechanism provided with a main driving-shaft; a galley mechanism receiving the type from the forming mechanism in the order of their construction and provided with a line-channel in which the type are assembled, a galley in which the lines are assembled and transferring devices for shifting completed lines from the line-channel to the galley; a counter-shaft constituting the driver for the galley mechanism; and controllable connections intermediate the said main and counter shafts for starting the latter in motion upon the completion of a predetermined series of type; substantially as described.

3. In a machine for forming and setting up lines of types, the combination with the type-forming mechanism provided with a main driving-shaft and governed by a perforated controlling-strip; of a galley mechanism provided with a separate driving-shaft; transmitting devices intermediate the main driving-shaft and the galley driving-shaft, including a driving-wheel and a driven pawl; a lever arranged to engage said pawl to disconnect it from its driving-wheel and arrest its motion; and a trigger acting upon the lever to disengage it from the pawl and allow the latter to reëngage the driving-wheel, said trigger being governed from the perforated controlling-strip through a pneumatically-operated piston; substantially as described.

4. In a machine for forming and setting up justified lines of types, the combination, substantially as described, with the matrix-centering devices, mold, justifying mechanism for varying the width of the mold, a type-carrier receiving the finished type from the mold, and an ejector for discharging the type from the carrier; of a line-channel in which the types are received and assembled, a line-transferring mechanism for shifting the completed line and presenting it in front of the galley, and a line-pusher operating transversely of the line to transfer the latter into the galley.

5. In a machine for forming and setting up justified lines of types, the combination substantially as described of the following elements, to wit, a type-forming mechanism comprising an adjustable mold, a series of matrices and mechanism for centering each matrix opposite the mold, justifying mechanism operating to vary the width of the mold, a metal-injecting apparatus, a type-carrier and ejector and a main driving-shaft; of a galley mechanism provided with a line-channel, a galley, a line-carrier, a pusher for transferring the line from the line-channel to the galley, and a driving-shaft for the galley mechanism, said shaft being connected to the main driving-shaft through controllable connections.

6. In a machine for forming and setting up justified lines of types, the combination substantially as described, of the following elements, to wit, a main driving-shaft, a movable series of matrices with actuating devices driven from the main shaft and including controllable devices for bringing any matrix to the casting-point, a mold provided with a movable section for varying the width of the mold-cavity, a justifying mechanism acting upon the movable section of the mold and deriving its movement from the main shaft through a controllable connection, a reciprocating type-carrier; a galley mechanism provided with line-channel, line-carrier; line-transferrer and galley; a driving-shaft for the galley mechanism connected to the main shaft through a controllable connection; and a perforated controlling-strip governing, through intermediate connecting means, the several controllable devices and members specified.

7. In a machine for forming and setting up justified lines of types, the combination, substantially as described, of the type-forming mechanism including movable matrices, mold-justifying mechanism and metal-injecting devices all deriving motion from a main driving-shaft and governed by a perforated controlling-strip; a galley mechanism, including line-channel, line-carrier, line-transferrer, galley and a driving-shaft deriving motion from the main shaft through controllable connections governed by the before-mentioned controlling-strip, and a type-carrier intermediate the mold and galley mechanism.

8. In a galley mechanism such as described, the line-channel provided with yielding type-sustaining dogs arranged in series, the proximate ends of adjacent dogs being formed with overlapping portions and the faces inclined in the direction of movement of the type in said channel.

9. In a galley mechanism such as described the combination of the following elements, to wit; a line-channel in which the individual type are successively delivered and set up; a type-sustaining blade; a line-carrier engaging the completed line, to remove it from the receiving portion of the line-channel; a galley; a movable blade; a rule at the entrance to the galley; and a line-transferrer opposite the entrance of the galley and opposite the delivery position of the line-carrier; whereby, at the completion of a line, the latter is moved bodily into position in front of the galley and transferred thereto; substantially as described.

10. In a galley mechanism such as described, the combination with the type-receiving channel; of the movable rule and line-transferrer located on opposite sides of and forming a continuation of said channel, the type-supporting blade frictionally connected to the line-transferrer and adapted to move longitudinally of the line-channel; the line-carrier movable longitudinally of the line-channel and operating to move the completed line against the resistance of the type-supporting blade, into position in front of the galley; and actuating mechanism competent to reciprocate the line-carrier, withdraw the blade from the entrance to the galley and reciprocate the line-transferrer and cause it to transfer the line of types from the line-channel, past the blade and into the galley.

11. In a galley mechanism such as described, the combination with the line-receiving channel furnished with type-supporting dogs, a laterally-movable head or line-transferrer, and a vertically-movable blade or rule; a type-sustaining blade mounted upon the line-transferrer, to reciprocate longitudinally within the line-channel and provided with a frictional resistance, a line-carrier movable longitudinally of the line-channel, to shift the completed line of types from the receiving end of said channel into position between the laterally-movable line-transferrer and vertically-movable rule; a galley for receiving successive lines, and actuating mechanism for shifting the line-carrier, elevating the rule, advancing the line-transferrer, partially retracting the rule, withdrawing the line-transferrer, fully retracting the rule, and retracting the line-carrier in a path to one side of the line-channel.

12. In a galley mechanism such as described, the combination of the line-channel; the line-transferrer movable laterally of said channel; the type-sustaining blade mounted to reciprocate longitudinally of the line-channel upon the line-transferrer; and the line-carrier reciprocating longitudinally of the line-channel and supported upon a base or slide movable transversely of said channel.

13. In a galley mechanism such as described the combination of the following elements, to wit; a line-channel in which successive type are set up to form a line; a galley; a line-transferrer; a type-sustaining blade in the line-channel; a line-carrier for engaging the completed line and moving it from the receiving to the delivering end of the line-channel; a trip mechanism located at the entrance to the galley; a driving mechanism provided with controllable disconnecting devices; and connections intermediate the trip and the controllable disconnecting devices for automatically disconnecting the driving mechanism when a line of abnormal dimensions is presented by the line-carrier; substantially as described.

14. In an organized type making and assembling machine the combination of the following elements, to wit; a type-forming mechanism adapted to produce and deliver the successive type for a line; a galley mechanism for receiving the type as delivered from the type-forming machine, assembling them in lines and transferring successive lines to the galley; galley-actuating mechanism deriving its motions from the driving-shaft of the type-forming mechanism through controllable connections; a trip mechanism located at or near the entrance to the galley in position to be engaged by the line as it is advanced into the galley; and connections intermediate the trip and the controllable connections of the actuating mechanism; substantially as described.

15. In a galley mechanism such as described, the combination of the line-channel, the laterally-reciprocating line-transferrer, the longitudinally-reciprocating type-sustaining blade mounted upon the line-transferrer and movable laterally with said transferrer; the block carried by the line-sustainer; the line-carrier attached to a rack-bar reciprocating longitudinally of the line-channel and mounted upon a laterally-movable slide, a rack-bar mounted upon the line-carrier rack-bar and provided with a dog for engaging the block on the sustainer, and the gears engaging the two rack-bars for transmitting motion from the line-carrier support to the dog for operating the type-sustainer.

16. In a galley mechanism such as described, the combination with the reciprocating line-transferrer, and the type-sustainer mounted to reciprocate on the line-transferrer and provided with a block or shoulder, of the line-carrier and its supporting rack-bar mounted to reciprocate upon a laterally-movable slide, two pinions mounted upon said slide; and the dog-carrying rack-bar mounted to reciprocate longitudinally of the line-carrier rack-bar.

17. In a galley mechanism such as described, the combination with the line-transferrer, the galley and the type-sustaining blade, of the line-carrier, and a trip-block located at the entrance of the galley in position to be engaged by the type and actuated to stop the machine in the event the line is above the standard in length.

18. In a galley mechanism such as described, the combination of the line-carrier; the line-transferrer; the type-sustainer; the galley; and the trip-block connected with the belt-shipper and provided with a grooved or recessed face to receive the end of the type-sustainer.

19. In a galley mechanism such as described, the combination of the line-carrier; the line-transferrer, the type-sustainer; the galley, and the trip-block located at the entrance to the galley upon an adjustable block or support and connected to the driving mechanism for stopping the latter in case the line is of abnormal length.

20. In a galley mechanism such as described, the combination of the reciprocating line-transferrer; the movable type-sustainer; the galley; the trip-block located at the entrance to the galley in position to be engaged by the type or the type-sustainer; the segment controlling the belt-shipper; and the trip-lever connected to the trip-block and engaging a shoulder on the segment.

21. In a galley mechanism such as described, the combination with the type-carrier, the ejector and the line-channel, of the line-carrier comprising a longitudinally reciprocating and laterally-movable support provided with pivoted arms with sustaining-springs therefor.

22. In a galley mechanism such as described, the combination of the line-channel provided with type-sustaining dogs, a line-carrier reciprocating longitudinally and laterally of the line-channel, a line-transferrer reciprocating laterally of and across the line-channel; a vertically-movable rule opposite the line-transferrer; a galley provided with a trip-block at its entering end; a type-sustainer mounted and reciprocating upon the line-transferrer; and a resetting or returning mechanism for the type-sustainer comprising a rack-bar mounted to reciprocate longitudinally upon the rack-bar of the line-carrier and provided with a dog for engaging the type-sustainer, and two gear-wheels connected to rotate in unison, and engaging, the one with the rack-bar of the line-carrier, and the other the rack-bar carrying the dog.

23. In a machine for forming and setting up justified lines of types the combination with the driving-shaft of the type-forming mechanism and the counter-shaft for actuating the galley mechanism, a connecting driving or transmitting shaft in two sections, one of said sections being driven from the main driving-shaft and the other connected to the galley-shaft; and a controllable clutch or connection adapted to effect the engagement of the two sections of the transmitting-shaft, and to automatically effect their disengagement at the termination of one complete revolution.

24. In a machine for forming and setting up justified lines of types the combination substantially as described of the driving-shaft of the type-forming mechanism; the driving-shaft of the galley mechanism; the intermediate or connecting shaft constructed in two sections, the one receiving motion from the main driving-shaft and the other transmitting motion to the galley-shaft; a ratchet-wheel secured to the driving-section of the connecting-shaft; a spring-actuated pawl provided with an engaging shoulder on its tail and mounted upon the driven section of the connecting-shaft; and a lever pivoted on the frame and adapted, when in position, to engage the shoulder on the tail of the pawl, to withdraw the latter from engagement with the ratchet-wheel and arrest the galley mechanism, and, when swung on its pivot, to release the pawl and permit it to engage and revolve with the ratchet-wheel.

25. The combination of the sectional connecting-shaft; the ratchet-wheel secured to the driving-section; the curved pawl carried by the driven section, said pawl being furnished with engaging teeth at one end, a shoulder at the opposite end, and an intermediate pivot; a spring acting upon said pawl in a direction to effect the engagement of its teeth with the ratchet-wheel; a lever bearing upon the pawl and adapted to engage the shoulder thereon; and a controllable trip mechanism for actuating the lever to release the pawl and effect the engagement of the driving and driven section of the shaft.

26. In a machine for forming and setting up justified lines of types, the combination, substantially as described, with the driving-shaft of the type-forming mechanism and the driving-shaft of the galley mechanism of the connecting-shaft formed in two sections, the driving-section carrying a toothed or ratchet wheel and the driven section a pawl; the lever actuating upon the pawl to alternately connect and disconnect it and the driving-wheel; and a trigger mounted upon a reciprocating pivot and provided with a shoulder for engaging the lever and an incline engaging a fixed pin or shoulder for tilting the trigger to disengage said lever and allow it to resume its normal position in the path of the pawl.

27. In a machine for forming and setting up justified lines of types, as a means for controlling the transmission of motion from the main driving-shaft to the galley-driving shaft, the combination substantially as described, of the driving ratchet-wheel; the driven pawl provided with a shoulder for disengaging it from the ratchet-wheel and arresting the motion of the galley mechanism; the lever arranged to engage said pawl; the reciprocating and laterally-movable trigger upheld by a spring; and the piston and cylinder through which a reciprocating movement is communicated to the trigger.

28. In a machine for forming and setting up lines of type, the combination with the driving-shaft of the type-forming mechanism, of a galley mechanism deriving its movements from a counter-shaft; a connecting or transmitting mechanism for communicating motion from the main shaft to the galley-shaft, including a driving-wheel and a driven pawl; a lever for engaging the pawl to withdraw it from engagement with its driving-wheel; a trigger acting upon the lever to withdraw it momentarily from engagement with the pawl; and a piston for actuating the trigger.

WILLIAM A. LORENZ.

Witnesses:
W. H. HONISS,
JENNIE NELLIS.